United States Patent [19]

Kume et al.

[11] Patent Number: 5,051,913
[45] Date of Patent: Sep. 24, 1991

[54] SYNCHRONOUS OPERATION CONTROL SYSTEM FOR NUMERICALLY CONTROLLED MACHINE

[75] Inventors: Masao Kume; Takeshi Masaki, both of Sayama, Japan

[73] Assignee: Honda Giken Kogyo Kabushiki Kaisha, Tokyo, Japan

[21] Appl. No.: 311,636

[22] Filed: Feb. 16, 1989

[30] Foreign Application Priority Data

Feb. 22, 1988 [JP] Japan .................................. 63-39163
Dec. 2, 1988 [JP] Japan .................................. 63-306511

[51] Int. Cl.⁵ .............................................. G06F 15/00
[52] U.S. Cl. ............................ 364/474.28; 364/474.12
[58] Field of Search .............. 364/167.01, 174, 474.12, 364/474.28, 474.35; 318/571, 574, 636, 568

[56] References Cited

U.S. PATENT DOCUMENTS

| | | | |
|---|---|---|---|
| 2,852,189 | 9/1958 | Becker et al. | 318/567 |
| 4,053,819 | 10/1977 | Matsumoto | 318/636 |
| 4,084,083 | 4/1978 | McNally et al. | 364/118 |
| 4,215,299 | 7/1980 | Edwin et al. | 318/574 |
| 4,312,033 | 1/1982 | Sweeney et al. | 364/167 |
| 4,379,987 | 4/1983 | Kohzai et al. | 318/561 |
| 4,439,825 | 3/1984 | Donner | 364/167.01 |
| 4,486,693 | 12/1984 | Hamati et al. | 364/174 |
| 4,488,237 | 12/1984 | Aronson et al. | 364/174 |
| 4,631,869 | 12/1986 | Miyatake et al. | 51/165.71 |
| 4,663,721 | 5/1987 | Herscovici | 364/475 |
| 4,710,865 | 12/1987 | Higomura | 364/167.01 |
| 4,786,847 | 11/1988 | Daggett et al. | 318/568 |
| 4,810,945 | 3/1989 | Yoneda et al. | 318/571 |
| 4,845,416 | 7/1989 | Scholl et al. | 364/167.01 |
| 4,906,908 | 3/1990 | Papiernik et al. | 364/474.35 |
| 4,947,336 | 8/1990 | Froyd | 364/167.01 |

FOREIGN PATENT DOCUMENTS

| | | |
|---|---|---|
| 1508552 | 4/1978 | United Kingdom . |
| 2011651 | 7/1979 | United Kingdom . |
| 1551979 | 9/1979 | United Kingdom . |
| 2040504 | 8/1980 | United Kingdom . |
| 2073114 | 10/1981 | United Kingdom . |

Primary Examiner—Jerry Smith
Assistant Examiner—Jim Trammell

[57] ABSTRACT

A synchronous operation control system for a numerically controlled machine such as a gear grinding machine or a hobbing machine includes a first motor for rotating a master shaft supporting a tool, a second motor for rotating a slave shaft, and a workpiece shaft operatively coupled to the slave shaft for supporting a workpiece which is to be machined by the tool. First and second encoders are coupled respectively to the master and slave shafts. Processors are provided for differentiating output signals from the first and second encoders with respect to time and thereafter calculating at least positional errors between the master, slave, and workpiece shafts. In addition, an adder is provided for adding output signals from the processors and applying an output signal to the second motor.

14 Claims, 16 Drawing Sheets

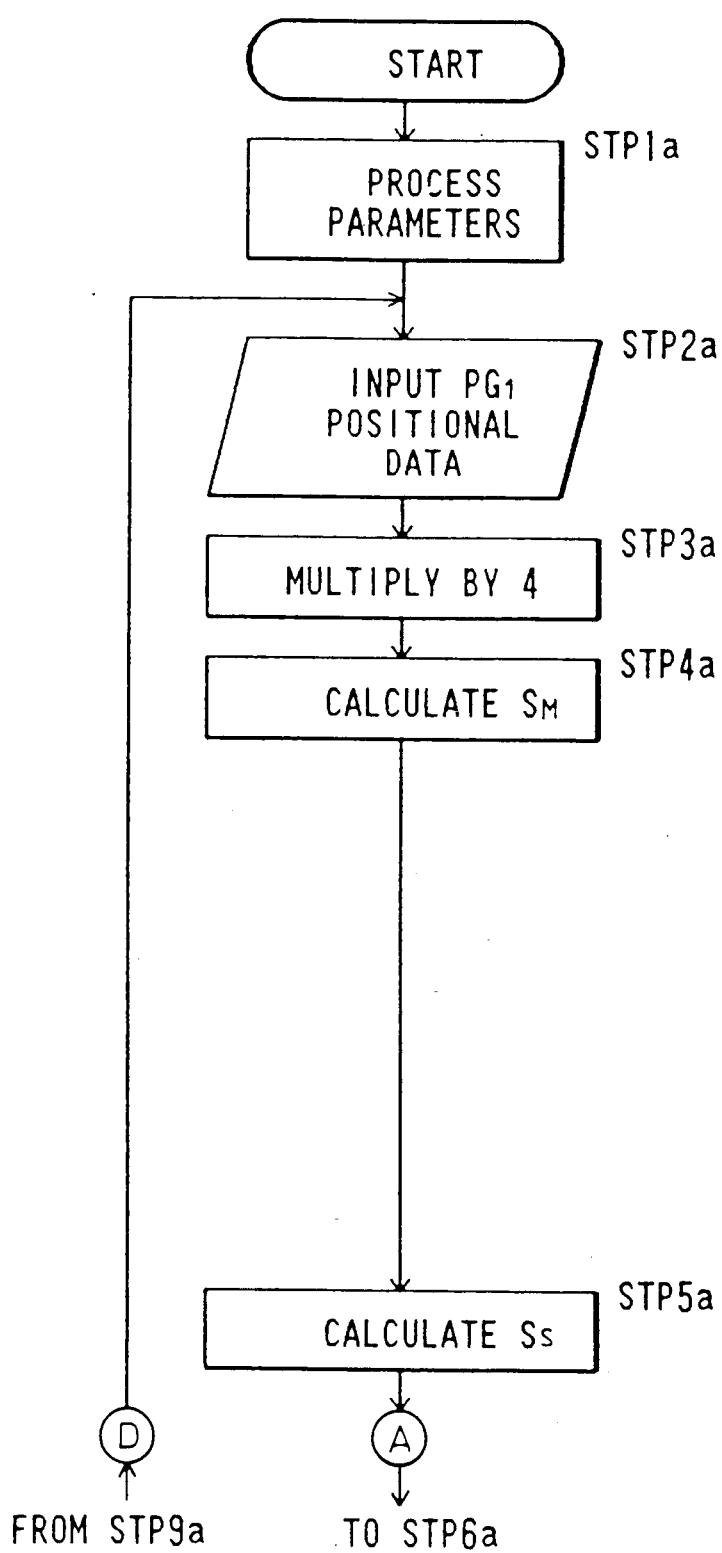

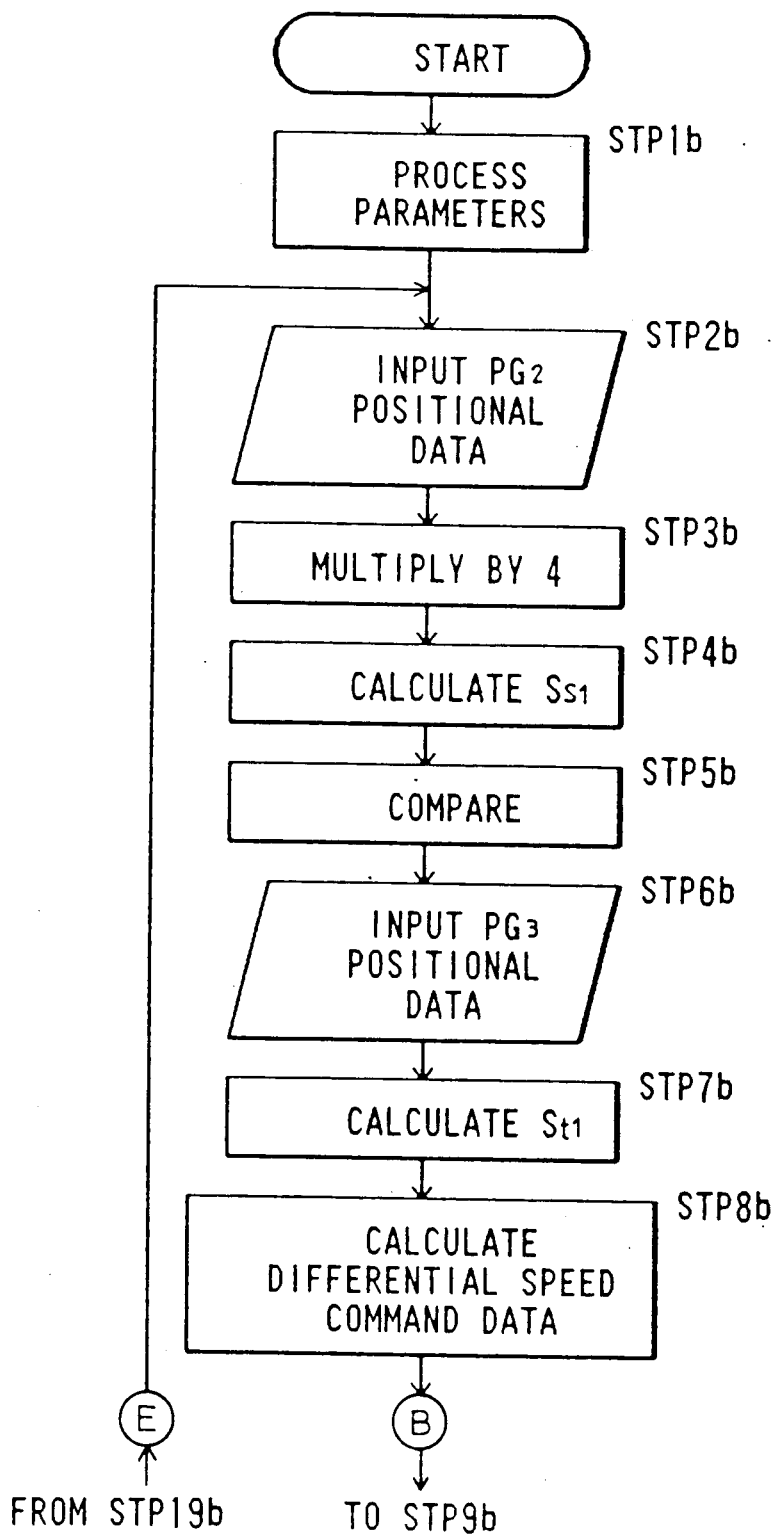

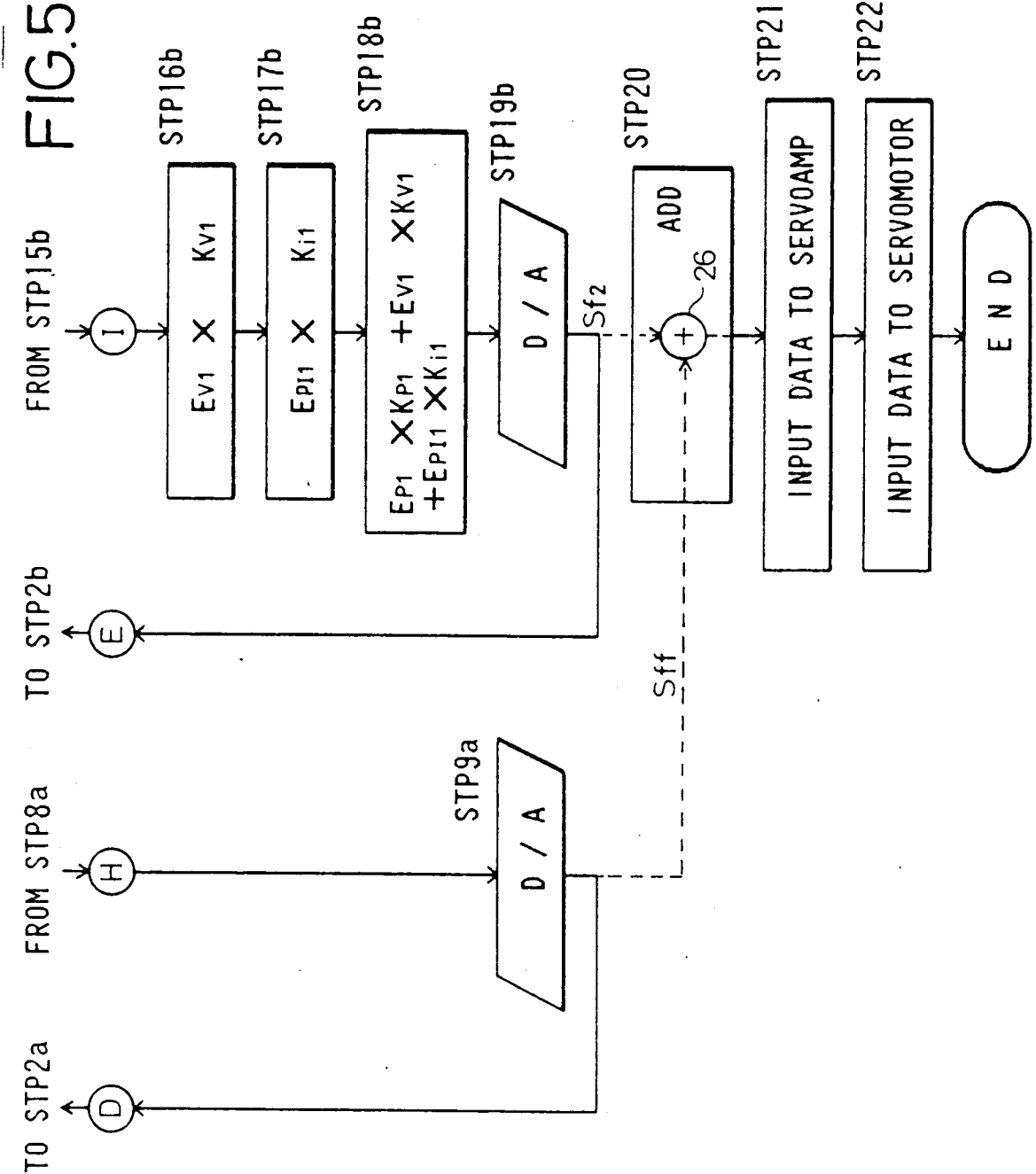

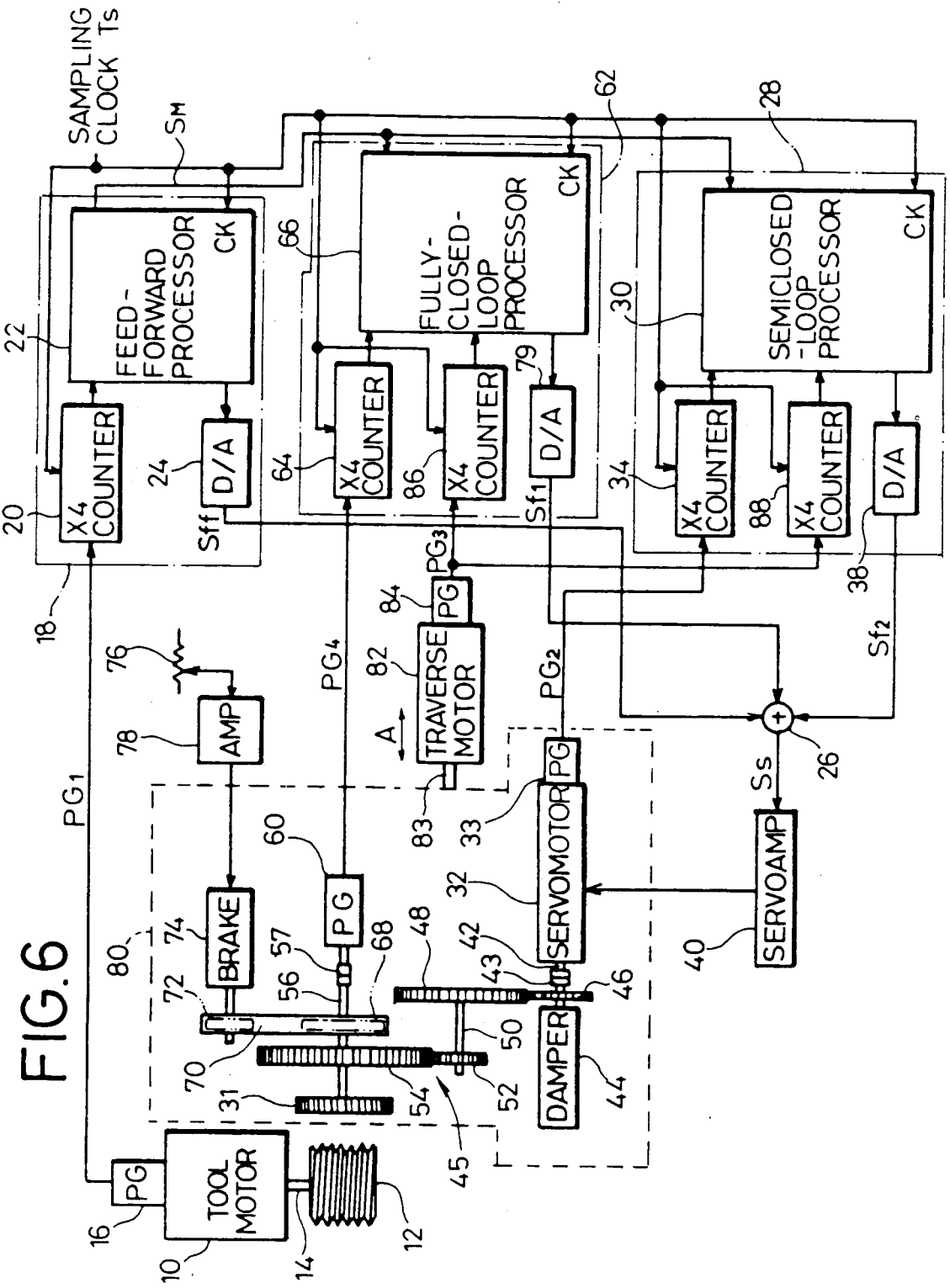

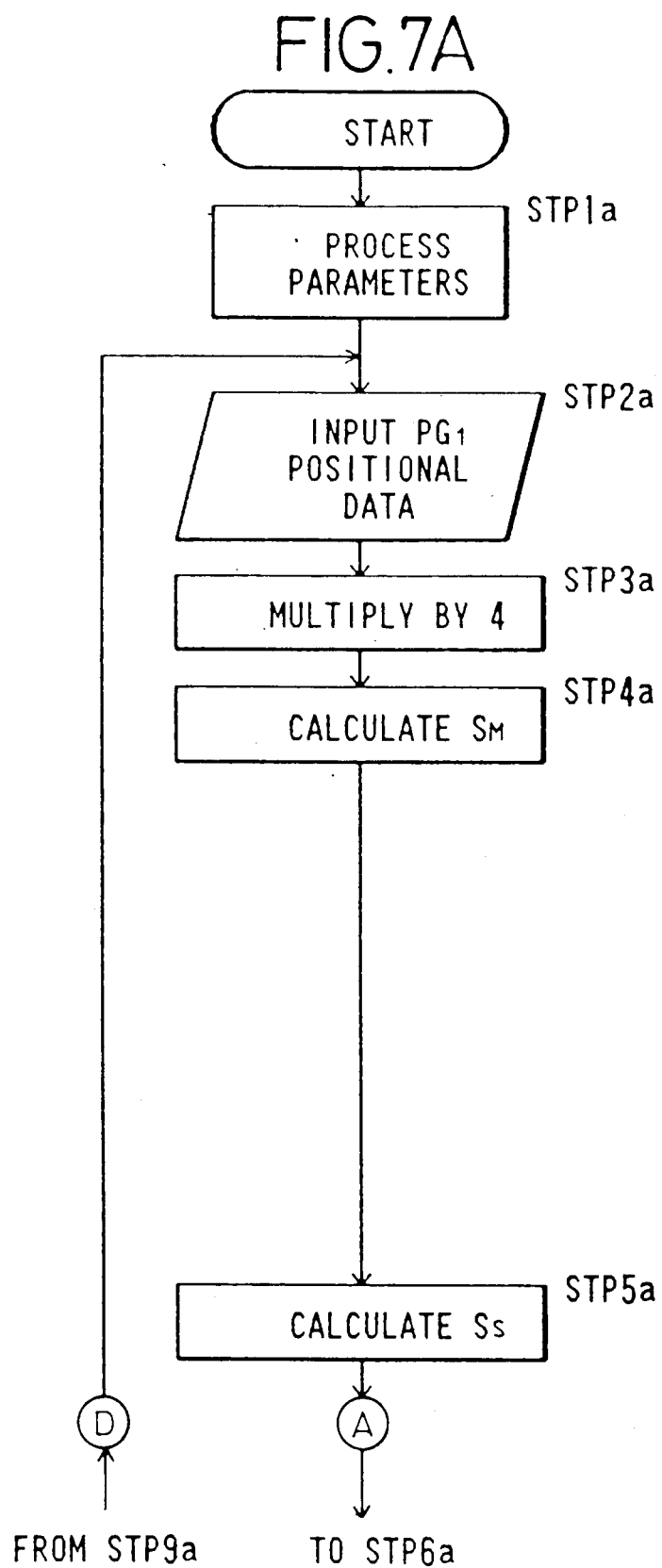

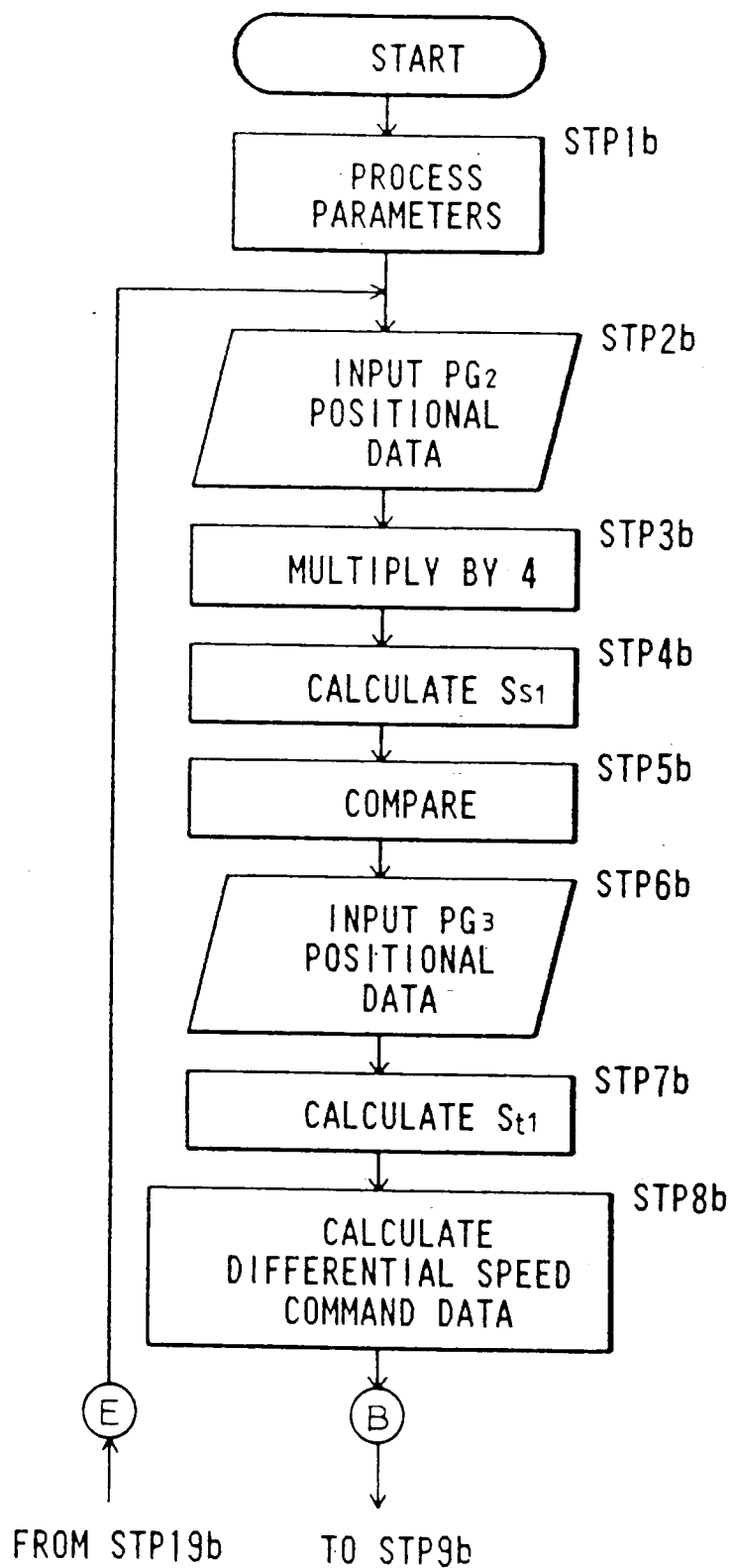

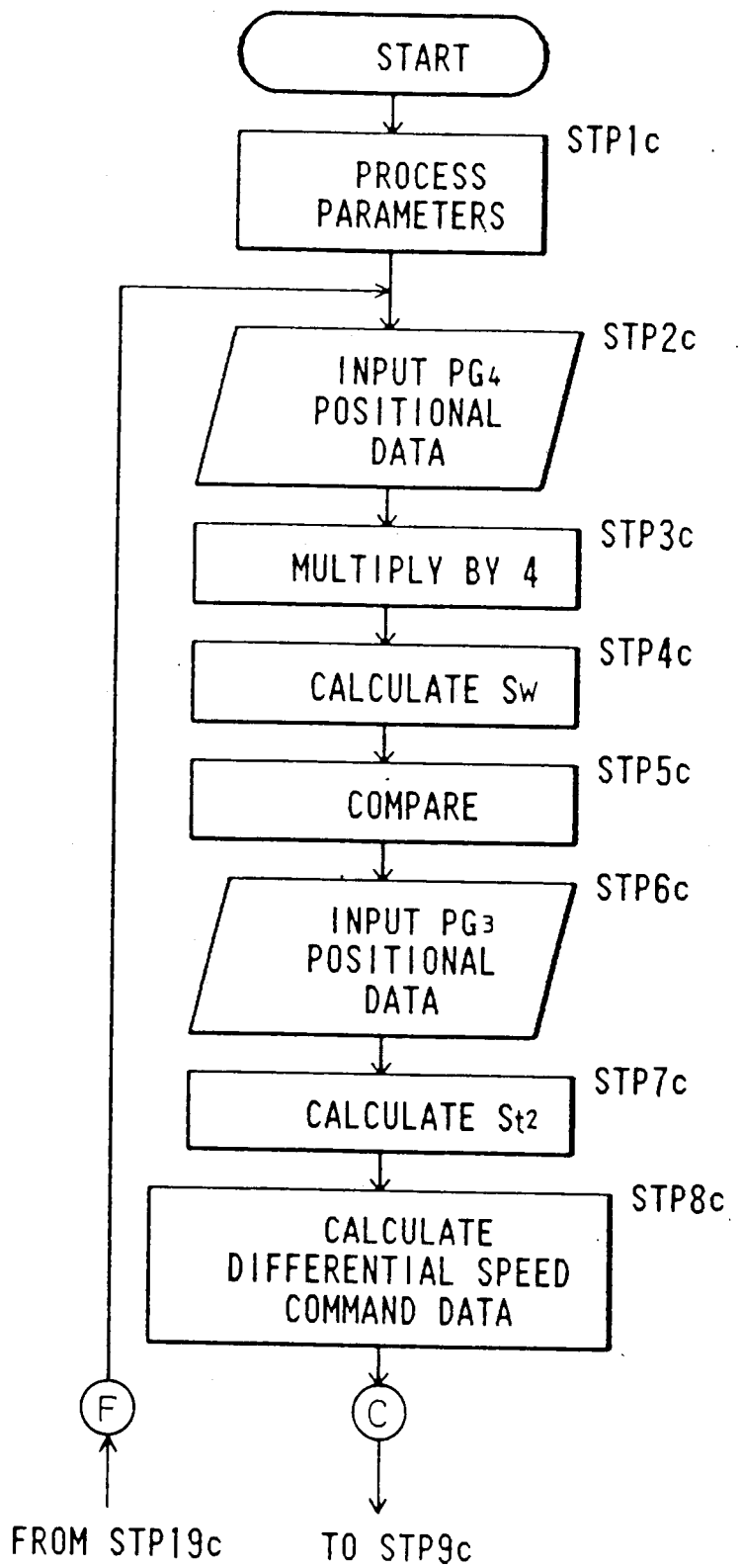

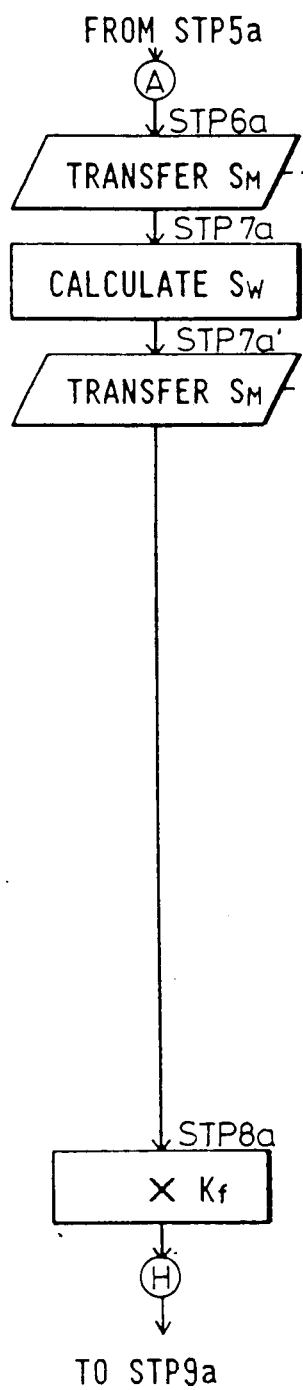
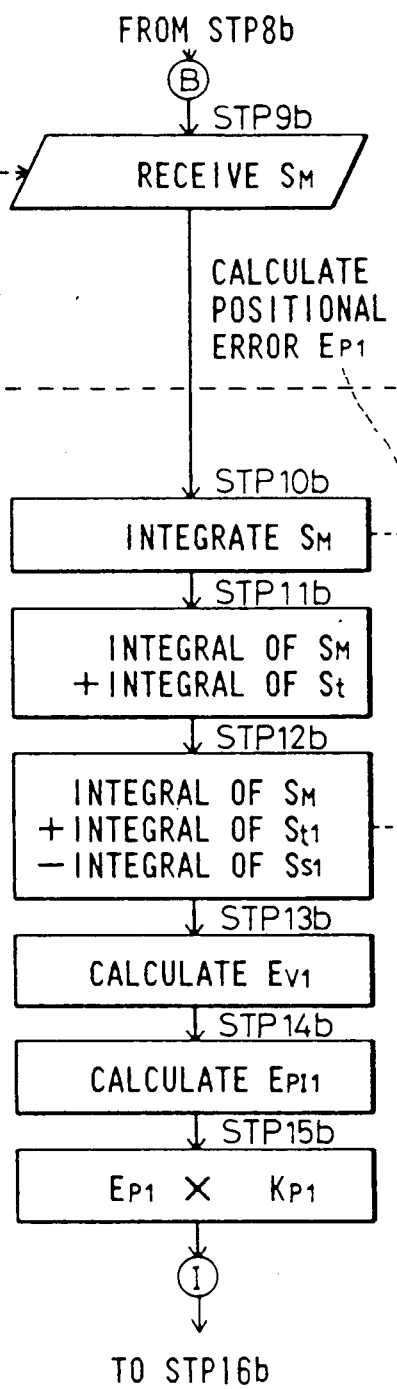
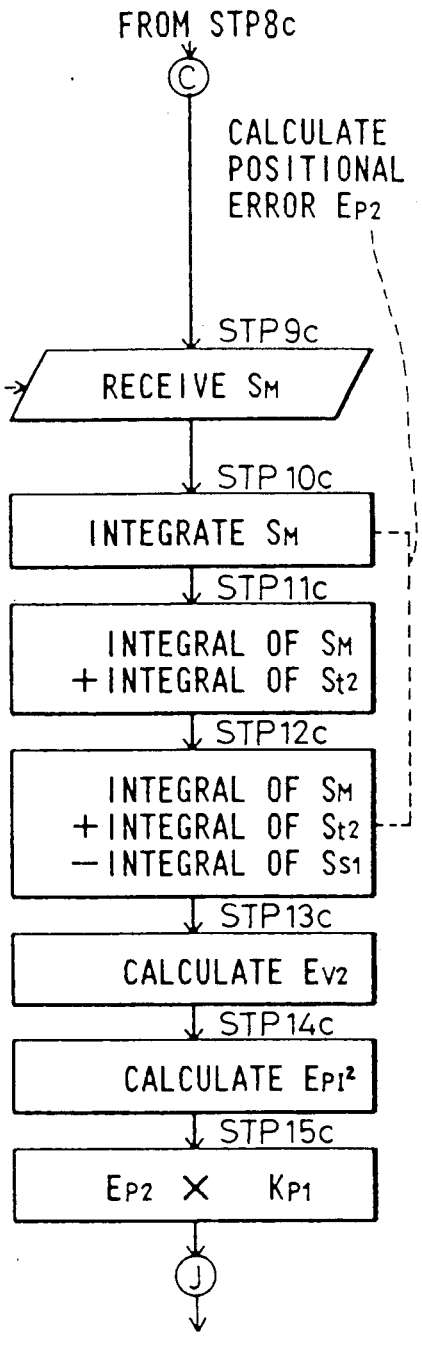

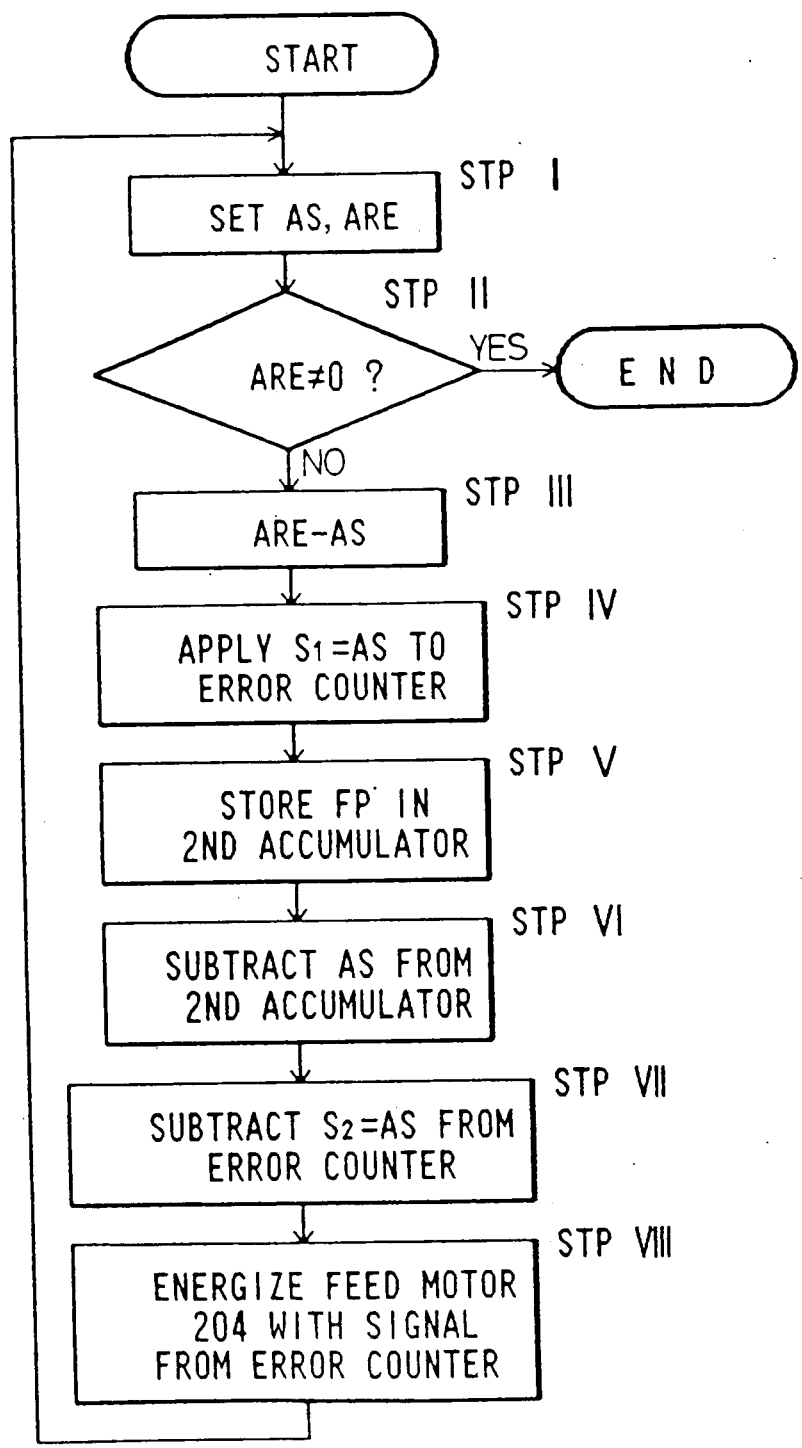

SYNCHRONOUS OPERATION CONTROL SYSTEM FOR NUMERICALLY CONTROLLED MACHINE

BACKGROUND OF THE INVENTION

The present invention relates to a synchronous operation control system for use with a numerically controlled machine such as a gear grinding machine, a hobbing machine, or the like in which a tool and a workpiece are required to operate synchronously, and more particularly a synchronous operation control system for monitoring, on a multiplex basis, a grinding tool mounted on a master shaft, a workpiece mounted on a workpiece shaft, and a servomotor coupled to a slave shaft which rotates the workpiece, for their synchronous operation, and for keeping them in an optimally synchronous condition at all times.

There have recently been put to use synchronously operated gear grinding machines in which a grinding tool such as a grinding wheel having a helical ridge on its outer peripheral surface, and a workpiece such as a gear to be ground are held in mesh with each other, and a shaft on which the grinding wheel is mounted and a shaft on which the gear is mounted are synchronously rotated to cause the grinding wheel to grind and finish the gear to desired dimensions.

One such synchronously operated gear grinding machine is disclosed in U.S. Pat. No. 4,631,869 assigned to the present assignee. The disclosed gear grinding machine is constructed as follows: A feed table is disposed on a bed and movable back and forth, and a traverse table is supported on the feed table for displacement in directions normal to the direction of movement of the feed table. A workpiece to be ground is detachably mounted on the traverse table and rotatable by a workpiece spindle motor.

A column is mounted on the bed, and a turntable is rotatably supported on the column and supports a shift table. The shift table holds a wheel spindle unit on which a grinding wheel is detachably supported in mesh with the workpiece. The grinding wheel is rotated to grind the teeth of the workpiece, i.e., a gear.

In order to finish the gear to desired dimensions, the gear is required to be ground while the two shafts are being operated in a synchronous condition, i.e., the ridge on the grinding wheel is being aligned with the groove between teeth on the gear within a predetermined range. If the gear were ground while the shafts are not being synchronously operated, the gear teeth would be curved, the pitch of teeth of the gear would be varied, or other grinding errors would occur.

Some conventional synchronous operation control systems employ electric means for achieving synchronous operation of the shafts in such synchronously operated grinding machines. To obtain highly accurate synchronism between the shafts, a stepping motor is used as an electric means. For high-speed high-torque synchronous operation, a servomotor is employed as the electric means. Where the stepping motor is used, it is quite difficult to attain a desired grinding speed and a high torque. The synchronous operation control system using the servomotor fails to achieve a desired degree of accuracy of synchronous operation. Therefore, it has been difficult to achieve both high accuracy and increased cycle time on a single synchronous operation control system. When a stepping motor is energized, the intervals between pulses for energizing the stepping motor should be as constant as possible to prevent the stepping motor from running out of control. To meet this requirement, synchronous command pulses and differential command pulses must be added and subtracted through highly complex arithmetic operations, and the summation of the synchronous command pulses and the differential command pulses must depend upon a hardware-implemented logic circuit.

To avoid the above drawbacks, there have been proposed synchronous operation control systems for numerically controlled machines which employ a servomotor and process output data from a rotary encoder coupled to the servomotor according to a software program so that high accuracy and increased cycle time can be attained without relying upon a complex pulse logic circuit.

One example of such a synchronous operation control system is disclosed in Japanese Patent Publication No. 59-35729. The disclosed synchronous operation control system includes a detecting means for detecting the angular position of either a hobbing shaft for cutting the teeth of a gear or a motor for rotating the hobbing shaft, and energizes a motor to rotate the gear in synchronism with the hobbing shaft rotating motor based o a positional signal generated by the detecting means.

SUMMARY OF THE INVENTION

It is a major object of the present invention to provide a synchronous operation control system for use with a machine tool such as a gear grinding machine, a hobbing machine, or the like, the synchronous operation control system employing a master/slave control arrangement in which angular positional information is detected by a rotary encoder mounted on a master shaft and processed to control a slave shaft to rotate synchronously with the master shaft, and allowing various data such as a synchronous rotational speed ratio and parameter gains (e.g., a speed error gain, a positional error gain, and the like) to be entered all as numerical data, so that various specifications of workpieces (e.g., the number of teeth, the module, the helix angle of thread, and the like if the workpiece is a gear) and various specifications of the machine (e.g., the number of threads of the tool, the speed reduction ratio of the gear train, and the like) can be switched instantaneously to make the machine tool flexible enough to manufacture many different product types each in a small quantity.

Another object of the present invention is to provide a synchronous operation control system for a numerically controlled machine, comprising: a master shaft with a tool mounted thereon; a first motor for rotating said master shaft; a slave shaft; a second motor for rotating said slave shaft; a workpiece shaft operatively coupled to said slave shaft for supporting a workpiece which is to be machined by said tool; first and second encoders coupled respectively to said master and slave shafts; processing means for differentiating output signals from said first and second encoders with respect to time and thereafter calculating at least positional errors between said master, slave, and workpiece shafts; and means for adding and subtracting output signals from said processing means and applying an output signal to said second motor.

Still another object of the present invention is to provide a synchronous operation control system for a numerically controlled machine, comprising: a maser shaft with a tool mounted thereon; a first motor for rotating said master shaft; a slave shaft; a second motor for rotating said slave shaft; a workpiece shaft operatively coupled to said slave shaft for supporting a workpiece which is to be machined by said tool; a traverse shaft for moving said slave shaft and said workpiece shaft in unison with each other in a traverse direction; a third motor operatively coupled to said traverse shaft; first, second, and third encoders coupled respectively to said master, slave shafts, and traverse shafts; processing means for differentiating output signals from said first, second, and third encoders with respect to time and thereafter calculating at least positional errors between said master, slave, workpiece, and traverse shafts; and means for adding and subtracting output signals from said processing means and applying an output signal to said second motor.

Yet another object of the present invention is to provide a synchronous operation control system wherein each of said processing means comprises means for multiplying an output signal from the encoder which has a lower resolution and thereafter comparing an output signal from the encoder which has a higher resolution to calculate a difference therebetween as the positional error.

Yet still another object of the present invention is to provide a synchronous operation control system for a numerically controlled machine, comprising: a master shaft with a tool mounted thereon; a first motor for rotating said master shaft; a slave shaft; a second motor for rotating said slave shaft; a workpiece shaft operatively coupled to said slave shaft for supporting a workpiece which is to be machined by said tool; first, second, and third encoders coupled respectively to said master, slave shafts, and workpiece shafts; processing means for differentiating output signals from said first, second, and third encoders with respect to time and thereafter calculating at least positional errors between said master, slave, workpiece, and workpiece shafts; and means for adding and subtracting output signals from said processing means and applying an output signal to said second motor.

A further object of the present invention is to provide a synchronous operation control system for a numerically controlled machine, comprising: a master shaft with a tool mounted thereon; a first motor for rotating said master shaft; a slave shaft; a second motor for rotating said slave shaft; a workpiece shaft operatively coupled to said slave shaft for supporting a workpiece which is to be machined by said tool; a traverse shaft for moving said slave shaft and said workpiece shaft in unison with each other in a traverse direction; a third motor operatively coupled to said traverse shaft; first, second, third, and fourth encoders coupled respectively to said master, slave shafts, workpiece, and traverse shafts; processing means for differentiating output signals from said first, second, third, and fourth encoders with respect to time and thereafter calculating at least positional errors between said master, slave, workpiece, and traverse shafts; and means for adding and subtracting output signals from said processing means and applying an output signal to said second motor.

A further object of the present invention is to provide a synchronous operation control system further comprising a feed shaft for moving said slave shaft and said workpiece shaft, and a servo drive source operatively coupled to said feed shaft for moving the feed shaft to allow said tool to machine said workpiece in a direction along said feed shaft.

It is also an object of the present invention to provide a synchronous operation control system for a numerically controlled machine, comprising: a servo drive source for moving a workpiece with respect to a tool; a first multiplier for multiplying data indicative of a moving distance to be traversed by said servo drive source; a first accumulator for temporarily storing an output signal from said first multiplier; a position detector coupled to said servo drive source; a counter for counting pulses from said position detector; a second multiplier for multiplying an output signal from said counter; a second accumulator for temporarily storing an output signal from said second multiplier; an error counter for calculating a difference between output signals which are applied from said first and second accumulators in synchronism with a sampling signal, and for applying an output signal to said servo drive source to move said workpiece smoothly.

Another object of the present invention is to provide a synchronous operation control system wherein each of said first and second multipliers multiplies the output signal by a number which is equal to the number of sampling cycles per unit.

Still another object of the present invention is to provide a synchronous operation control system wherein said servo drive source comprises a servomotor.

A still further object of the present invention is to provide a synchronous operation control system wherein each of said encoders comprises a pulse generator.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 3A, 3B, 4A, 4B, and 5 are a flowchart of an operation sequence of the gear grinding apparatus of FIG. 1;

FIG. 6 is a block diagram of a gear grinding apparatus incorporating a synchronous operation control system according to another embodiment of the present invention;

FIGS. 7A through 7C, 8A through 8C, and 9 are a flowchart of an operation sequence of the gear grinding apparatus of FIG. 6;

FIG. 13 is a flowchart of an operation sequence of the servo control system illustrated in FIG. 12.

DETAILED DESCRIPTION OF THE PREFERRED EMBODIMENTS

Figure 1:
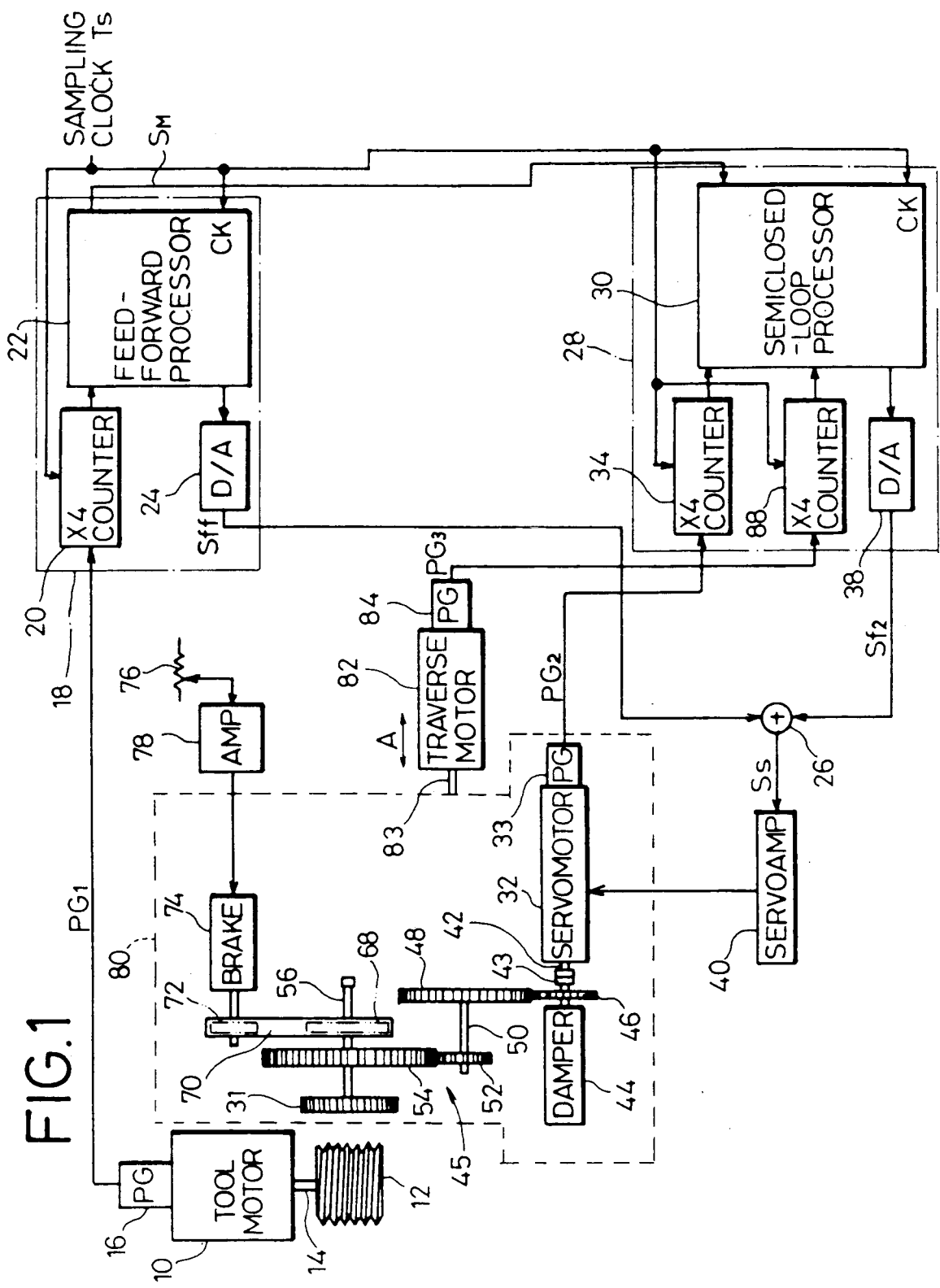
FIG. 1 is a block diagram of a gear grinding apparatus incorporating a synchronous operation control system according to the present invention.

FIG. 1 schematically shows a gear grinding apparatus incorporating a synchronous operation control system in accordance with an embodiment of the present invention. The gear grinding apparatus includes a tool motor 10 serving as a first motor for rotating a grinding wheel 12 (having a single helical tooth on its outer peripheral surface in the illustrated embodiment). The tool motor 10 is coupled to the grinding wheel 12 through a master shaft 14 as a tool shaft, and a first rotary encoder such as a pulse generator 16, for example, is coaxially connected to the master shaft 14. The rotational speed of the motor 10, i.e., the rotational speed $N_M$ of the master shaft 14, is 3000 rpm, and the resolution of the pulse generator 16, i.e., the resolution $R_M$ of the master shaft encoder is 60000 p/r (pulses/revolution). An output signal $PG_1$ from the pulse generator 16 is applied to a feedforward processor 22 through a multiply-by-4 counter 20 in a feedforward control panel 18. A processed signal $V_{(D/A24)}$, described later on, from the feedforward processor 22 is then applied through a D/A converter 24 as a feedforward command signal Sff to a first input terminal of an adder 26.

Master shaft speed data which is other processed data $S_M$ from the feedforward processor 22 is delivered to an input terminal of a semiclosed-loop processor 30 in a semiclosed-loop control panel 28. Another input terminal of the semiclosed-loop processor 30 is supplied with an output signal $PG_2$ from a pulse generator 33 coupled as a second rotary encoder to a servomotor 32 as a second motor, through a multiply-by-4 counter 34. Based on the feedback output signal $PG_2$, the semiclosed-loop processor 30 applies a semiclosed-loop command signal $Sf_2$ through a D/A converter 38 to a second input terminal of the adder 26. The adder 26 then issues slave shaft speed data Ss as an output signal via a servoamplifier 40 to the servomotor 32 to control the rotational speed thereof for rotating a workpiece.

The servomotor 32 is coupled to one end of a slave shaft 42 the other end of which is connected through a coupling 43 to an inertia damper 44 for dampening inertial forces of the system and a first gear 46 is disposed in coaxial relationship therewith. The first gear 46 is held in mesh with a second gear 48 coupled through a shaft 50 to a third gear 52 which is in mesh with a fourth gear 54. The fourth gear 54 is fixedly mounted coaxially on a workpiece shaft 56 supporting on one end a workpiece 31 which comprises a gear to be ground. These gears will collectively be referred to as a gear train 45.

The workpiece shaft 56 is operatively connected to a hysteresis brake 74 through a first pulley 68 on he shaft 56, a second pulley 72 coupled to the brake 74, and a belt 70 trained around the pulleys 68, 72. The braking forces produced by the hysteresis brake 74 are variable by a current signal issued by an amplifier 78 which amplifies an output signal from an adjusted potentiometer 76.

The servomotor 32, the workpiece 31, and the other parts operatively coupled thereto are mounted on a traverse table 80 which is movable back and forth in the directions of the arrow A by a traverse motor 82 as a third motor through a ball screw (not shown) and a traverse shaft 82. A pulse generator 84 serving as a third rotary encoder is coupled to the traverse motor 82, and applies an output signal $PG_3$ to the semiclosed-loop processor 30 through a multiply-by-4 counter 88 in the semiclosed-loop control panel 28. The distance which the traverse table 80 is caused to traverse in the direction of the arrow A by the traverse motor 82 is processed in a predetermined differential operation (described later on) by the semiclosed-loop processor 30. The processed result is added to the semiclosed-loop command signal $Sf_2$ which is applied through the D/A converter 38 to the adder 26.

The feedforward control panel 18 and the semiclosed-loop control panel 28 have clock input terminals CK which are supplied with a sampling clock signal Ts that is produced by frequency-dividing an output signal from a quartz oscillator (not shown). In the illustrated embodiment, the sampling clock signal Ts has a sampling time ts of 300 μs.

Figure 2:
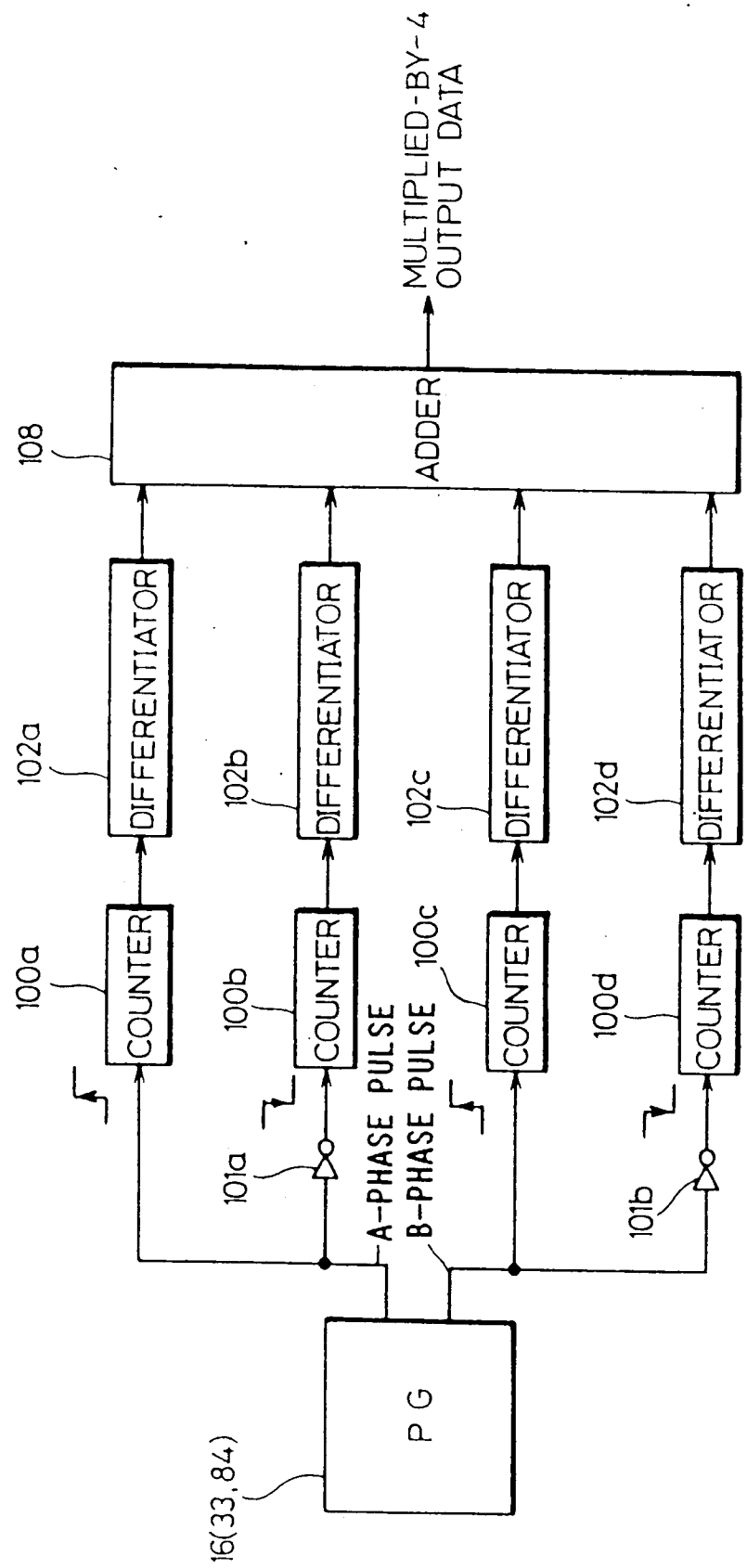
FIG. 2 is a block diagram showing in detail a multiply-by-4 counter in the gear grinding apparatus shown in FIG. 1.
Figure 4A:
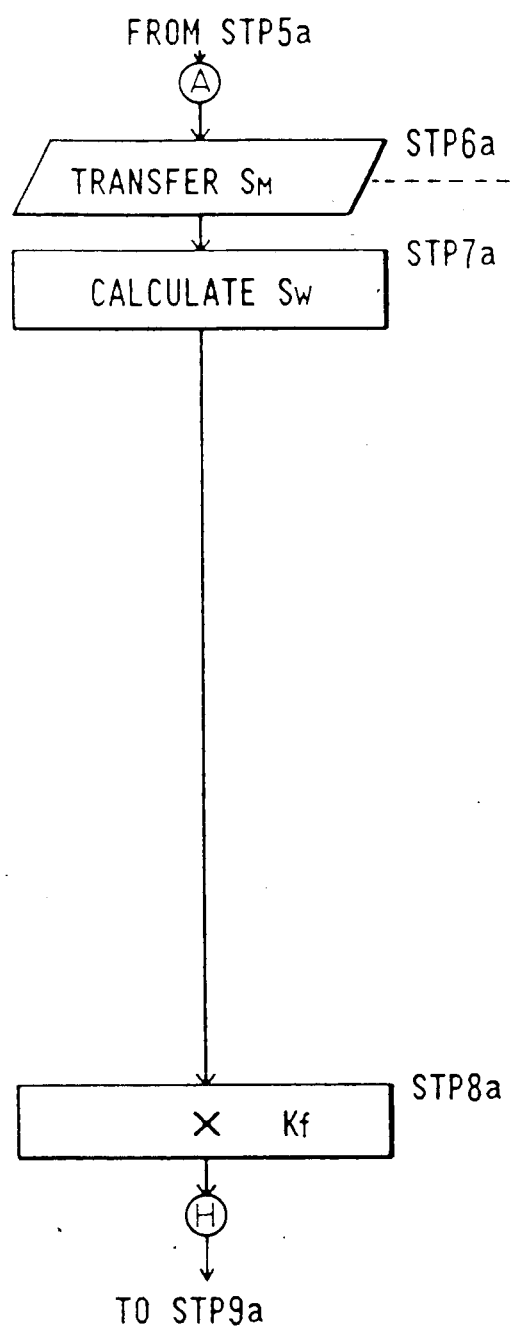
Figure 4B:
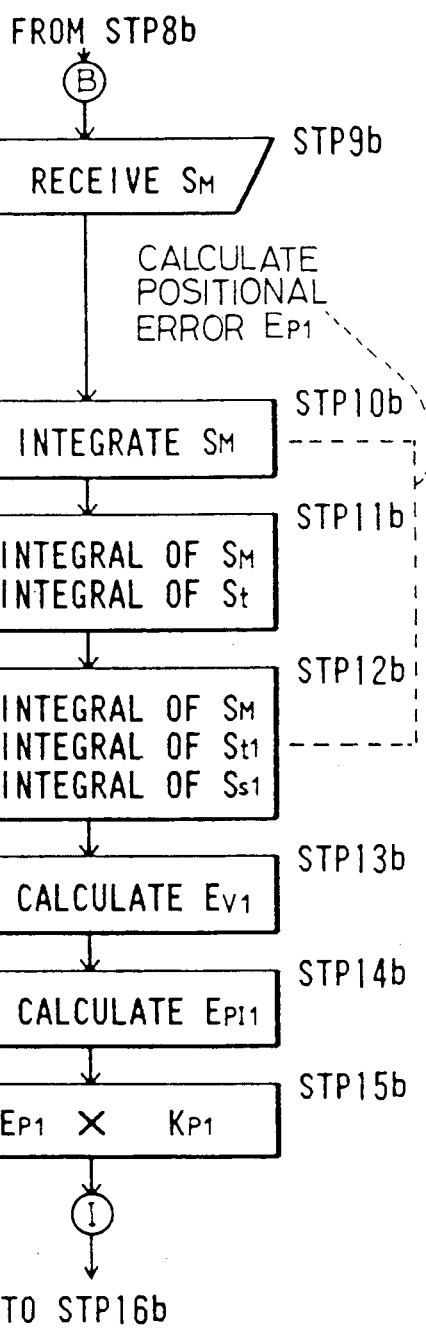
Figure 9:
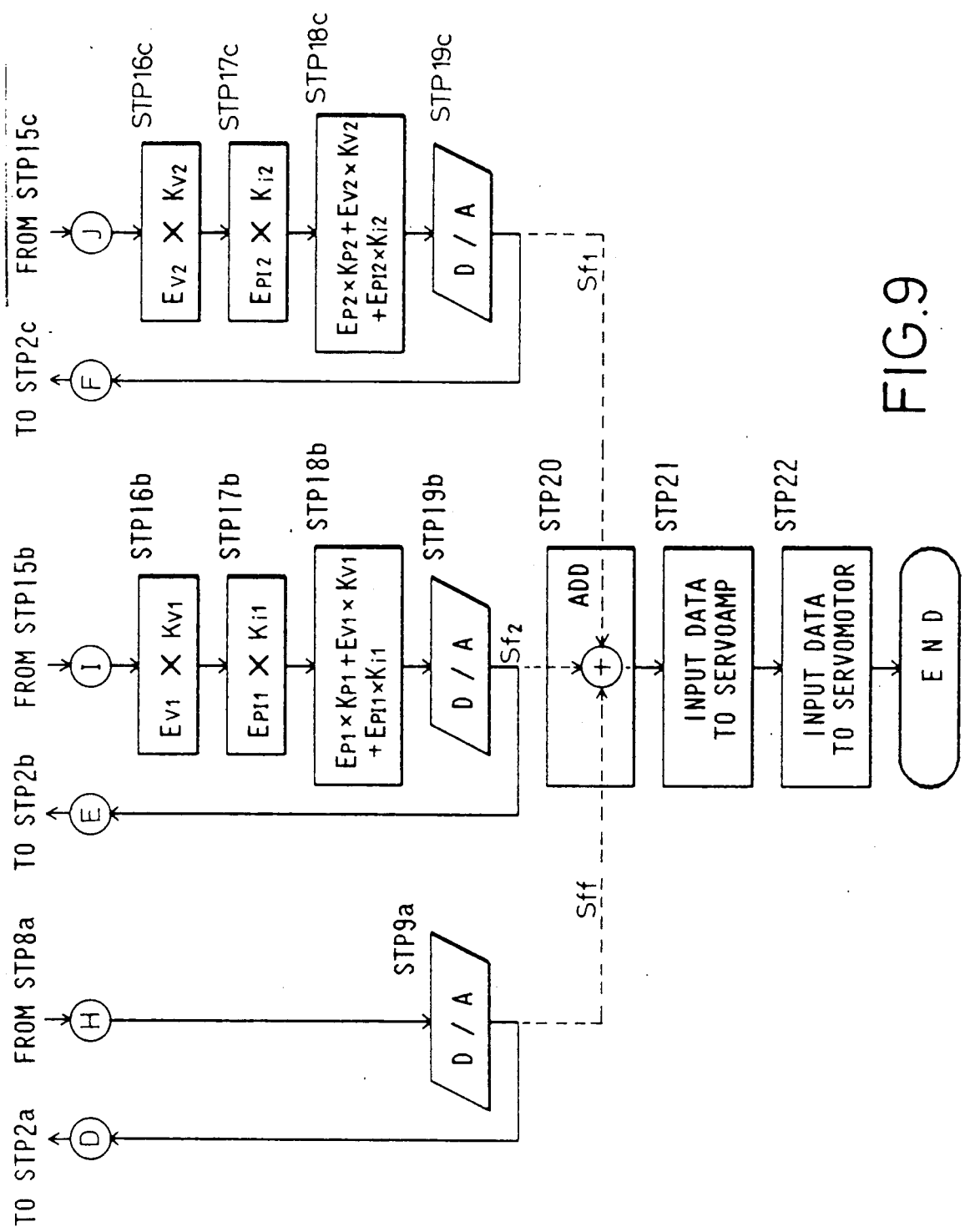

FIG. 2 shows in detail each of the multiply-by-4 counters 20, 34, 88 illustrated in FIG. 1. Each of the multiply-by-4 counters 20, 34, 88 includes counters 100a, 100c for counting positive-going edges of A- and B-phase pulses produced by one of the pulse generators 16, 33, 84, and counters 100b, 100d for counting negative-going edges of the A- and B-phase pulses which are inverted by respective inverters 101a, 101b. Output data from the counters 100a through 100d are differentiated with respect to time by respective differentiators 102a through 102d each time the sampling clock signal Ts is applied, thus generating speed data which are added into multiplied-by-4 output data by an adder 108.

Operation and advantages of the gear grinding apparatus thus constructed will be described below.

Various specifications of the workpiece 31 and various specifications such as resolutions of the pulse generators 16, 33, 84 are given in Table 1 below. These specifications are entered into memories (not shown) in the feedforward processor 22 and the semiclosed-loop processor 30 through input means (not shown):

TABLE 1

| Specifications | |
|---|---|
| Number of workpiece teeth | Z = 60 |
| Workpiece module | Mn = 2.5 |
| Helix angle of workpiece thread | β = LH 25° |
| Workpiece width | W = 20 mm |
| Resolution of master shaft encoder | RM = 60000 p/r |
| Resolution of slave shaft encoder | Rs = 240000 p/r |
| Number of encoder pulses produced each time traverse shaft moves 1 mm | Rt = 10000 p/mm |
| Speed reduction ratio for workpiece shaft | Q = 24 |
| Sampling time | ts = 300 μs |

Operations in a positioning loop, i.e., the semiclosed-loop control panel 28, where the workpiece is a spur gear will first be described, and then operations in the respective control panels, taking into consideration the amount of movement in the traverse direction, where the workpiece is a helical gear will be described.

A process of grinding a spur gear will first be described below. When the grinding wheel 12 is rotated at the speed $N_M$ = 3000 rpm by the tool motor 10, the pulse generator 16 generates an output signal $PG_1$ composed of successive pulses. The output signal $PG_1$ is applied via the counter 20 to the feedforward processor 22 in the feedforward control panel 18. Therefore, when the grinding wheel 12 as a tool is rotated at $N_M$ = 3000 rpm, pulses or master shaft speed data $S_M$ generated by the pulse generator 16 in each sampling time ts = 300 μs are 900 p/sample as indicated by the following equation (1):

$$S_M = (N_M/60) \times R_M \times ts \text{ (p/sample)} \quad (1)$$
$$= (3000/60) \times 60000 \times 300 \times 10^{-6}$$
$$= 900 \text{ (p/sample)}$$

The rotational speed $N_W$ of the workpiece if the number Z of teeth of the workpiece is $Z = 60$ when the rotational speed $N_M$ of the grinding wheel 12 is $N_M = 3000$ rpm, is 50 rpm as given by the following equation (2):

$$N_W = (P/Z) \times N_M \text{ (rpm)} = (1/60) \times 3000 \quad (2)$$
$$= 50 \text{ (rpm)}$$

where P is the number of the threads of the tool which corresponds to the number of the threads of the grinding wheel 12, and is 1 as described above.

In view of the fact that the gear train 45 interposed as a rotation transmitting means between the servomotor 32 and the workpiece 31 has a speed reduction ratio Q of 24:1 ($Q=24$), the servomotor 32 should be rotated at a speed of 1200 rpm as indicated by the following equation (3):

$$N_s = N_W \times Q \text{ (rpm)} = 50 \times 24 = 1200 \text{ (rpm)} \quad (3)$$

Assuming that a rated input voltage $V_R$ to be applied to the servomotor 32 when its rated rotational speed $N_{SR}$ is 3000 rpm is $V_R = 6$ V based on rated values of the servomotor 32 and the servoamplifier 40, the rotational speed of the servomotor 32 per one volt is 500 rpm/V, and a voltage of 2.4 V should be applied to the servomotor 32 by the servoamplifier 40 in order to rotate the servomotor 32 at 1200 rpm. This relationship is expressed by the following equation (4):

$$\begin{aligned}N_{SR}/V_R &= \text{Rated rotational speed/Rated input voltage} \\ &= 3000/6 = 500 \text{ (rpm/V)}\end{aligned} \quad (4)$$

If the D/A converter 24 is of 12 bits, and in order to obtain a voltage of 2.4 V to rotate the servomotor 32 at $Ns = 1200$ rpm with an output voltage which corresponds to 12 bits being $\pm 10$ V, a value $V_{(D/A24)} = 2539$ should be supplied to the D/A converter 24 as indicated by the equation (5):

$$V_{(D/A24)} = \frac{2^{12} \times 2.4}{20} + 2^{11} = 2539 \quad (5)$$

Therefore, the feedforward command signal Sff is given a value which is produced by converting the value $V_{(D/A24)}$ to an analog signal. In this embodiment, the servoamplifier 40 operates as a voltage follower. Insofar as the grinding wheel 12 is rotated at $N_M = 3000$ rpm, the workpiece 31 is synchronously rotated at $N_W = 50$ rpm.

A positional loop control system is required since the D/A converter 24 or the servoamplifier 40 is subjected to an error such as an analog offset or drift. Such a positional loop control system will be described below.

The positional loop control system comprises the semiclosed-loop control system which is composed of the semiclosed-loop control panel 28 for producing a feedback output signal $PG_2$ as converted to data of the workpiece shaft 56, from the slave shaft 42.

The semiclosed-loop control system which produces the feedback output signal $PG_2$ directly from the servomotor 32 hat is relatively stable without being affected by a backlash error caused by the gear train 45 is controlled with a high loop gain.

The semiclosed-loop control system controlled with a high loop gain will be described below. For achieving highly accurate synchronous rotation, it is necessary to effect accurate positional control. Such highly accurate synchronous rotation is obtained as follows: First, a positional output signal $PG_1$ produced by the pulse generator 16 in the feedforward control system, described above, is converted to master shaft speed data $S_M$, and then a positional output signal PG, produced by the pulse generator 33 in the semiclosed-loop control system is converted to slave shaft speed data Ss.

Then, the semiclosed-loop command signal $Sf_2$ is controlled by the semiclosed-loop processor 30 such that the product ($S_M \times Rs$) of the master shaft speed data $S_M$ and the resolution Rs of the pulse generator 33 will be of the same value as that of the product ($Ss \times R_M \times Z$) of the slave shaft speed data Ss of the pulse generator 33, the resolution $R_M$ of the pulse generator 16, and the number Z of teeth of the workpiece 31. A positional error Ep is calculated according to an equation (6) below. If the product of the master shaft speed data $S_M$ and the slave shaft encoder resolution ratio $Ro = Rs/R_M$ is equal to the product of the slave shaft speed data Ss, the master shaft encoder resolution ratio $R_1 = 1$, and the number Z of workpiece teeth, then it is determined that the master shaft 14 and the workpiece shaft 56 are completely synchronized. If the above products are different from each other, then the value produced by multiplying the difference or positional error Ep by a positional loop gain Kp (not shown) is issued to the D/A converter 38 to rotate the servomotor 32 to compensate for the positional error Ep.

$$\begin{aligned}Ep &= \text{(master shaft speed data} \times \text{slave shaft} \\ &\quad \text{encoder resolution ratio)} - \text{(slave shaft speed} \\ &\quad \text{data} \times \text{master shaft encoder resolution ratio} \times \\ &\quad \text{number of workpiece teeth)} \\ &= (S_M \times Rs/R_M) - (Ss \times 1 \times Z) \\ &= (900 \times 4) - (60 \times 1 \times 60) = 0\end{aligned} \quad (6)$$

The slave shaft speed data Ss is given by the following equation (7):

$$\begin{aligned}Ss &= \frac{Ns}{60} \times Rs \times ts \div Q \\ &= \frac{1200}{60} \times 240000 \times 300 \times 10^{-6} \div 24 \\ &= 60 \text{ (p/sample)}\end{aligned} \quad (7)$$

The result of the calculation according to the equation (6) indicates that the master shaft 14 and the slave shaft 42 are rotated in full synchronism with each other.

Now, a condition in which the master shaft 14 and the slave shaft 42 are rotated out of synchronism and correction is needed will be described below. It is assumed that an output signal $PG_2$ is applied to the semiclosed-loop control panel 28 such that the rotation of the slave shaft 42 is slightly delayed out of synchronism with the rotation of the master shaft 14 and the slave shaft speed data Ss is Ss=59 {which represents the servomotor rotational speed Ns =1180 (rpm)}. The positional error Ep then has a value of 60 as indicated by the following equation (8):

$$Ep = (900 \times 4) - (59 \times 1 \times 60) = 60 \ (p) \tag{8}$$

The positional error Ep is multiplied by the positional loop gain Kp in the semiclosed-loop processor 30, and the product is applied to the D/A converter 38, so that the rotational speed of the servomotor 32 is increased to eliminate the delay. Conversely, if the slave shaft 42 becomes faster than the master shaft 14 and the positional error Ep goes negative (Ep<0), the output signal from the D/A converter 38 also goes negative, thus delaying the servomotor 32 until it gains a normal rotational speed. The unit for the positional error Ep is [p]=[pulses] because the master shaft speed data $S_M$ and the slave shaft speed data Ss may substantially be of values thereof which are integrated with respect to the sampling time ts.

For grinding the spur gear, as described above, it is possible to rotate the master shaft 14 and the slave shaft 42 accurately in synchronism with each other with the feedforward control system and the positional loop control system. If no sufficient synchronous rotation can be achieved only by the feedforward control system and the positional loop control system, then it is possible to add various PID (proportional, integral, derivative) control systems such as a speed loop control system for differentiating the positional error Ep to control the slave shaft 42 with a speed error Ev, an acceleration loop control system for differentiating the speed error Ev to control the slave shaft 42 with an acceleration error Ea, and a positional integral error control system for integrating the positional error Ep to control the slave shaft 42 with a positional integral error Ep$_I$. The above description has been directed to the grinding of a spur gear in a first application.

A process of grinding a helical gear in a second application will be described below. In this grinding process, the distance by which the helical gear is moved in the traverse direction (i.e., in the axial direction of the gear) must be detected, and the synchronous rotation of the master and slave shafts 14, 42 must be differentially corrected. The differential correction is effected by detecting the distance of movement in the traverse direction with the pulse generator 84 connected to the traverse motor 82 and producing a value including the helix angle $\beta$ of the gear through arithmetic operations.

The diameter d of the helical gear on its pitch circle is 165.5 mm according to the following equation (9):

$$d = \frac{Z \cdot Mn}{\cos\beta} = \frac{60 \times 2.5}{0.9063} = 165.5 \text{ mm} \tag{9}$$

(see Table 1 above for the definition of the symbols)

An angle Y of displacement of the gear on its pitch circle across the gear width W=20 mm then becomes about 6.457° as indicated by the following equation (10):

$$Y = \frac{W \cdot \tan\beta}{\pi \cdot d} \times 360 = \frac{W \cdot \sin\beta}{\pi \cdot Z \cdot Mn} \times 360 \tag{10}$$

$$= \frac{20 \times 0.4226 \times 360}{\pi \times 60 \times 2.5} \approx 6.457°$$

Thus, when the helical gear is moved across its width W=20 mm in the traverse direction, it is necessary to correct the synchronous rotation by 6.457° on the pitch circle of the gear. The corrective value is then converted to feedback pulses per revolution of the workpiece shaft 56. Required feedback pulses Pd which correspond to the output signal PG$_3$ from the pulse generator 84 are 4305 as calculated by the equation (11) below. The same feedback pulses Pd can be calculated from the displacement angle Y on the pitch circle (see the equation (12) below):

$$Pd = \frac{Rt \times W}{Rt} \times \frac{\sin\beta}{\pi \cdot Z \cdot Mn} \times Rs \ (p) \tag{11}$$

$$= \frac{200000}{10000} \times \frac{0.4226}{\pi \times 60 \times 2.5} \times 240000$$

$$\approx 4305 \ (p)$$

$$Pd = \frac{Y}{360} \times Rs \tag{12}$$

$$= \frac{6.457}{360} \times 240000 = 4305 \ (p)$$

Therefore, when the helical gear traverses its width W=20 mm, about 4305 feedback pulses Pd should be corrected. In reality, the above calculations are effected in each sampling time ts=300 μs. Since the traversing speed is 1 mm/sec. in this embodiment, pulses to be generated per sampling cycle, i.e., the traverse shaft speed data St, is 3 (p/sample) as calculated from the following equation (13), and differential speed command data Sd is indicated by the equation (14):

$$St = 1 \times Rt \times ts \tag{13}$$

$$= 1 \times 10000 \times 300 \times 10^{-6} = 3 \ (p/\text{sample})$$

$$Sd = \frac{3 \times 0.4226 \times 24000}{10000 \times \pi \times 60 \times 2.5} \tag{14}$$

$$\approx 0.06457 \ (p)$$

Consequently, 0.06457 pulse is corrected per sampling time ts. Inasmuch as this value is only a decimal fraction, it does not allow integral operations by itself, and hence is normalized by being multiplied by a multiplier. Stated otherwise, the differential speed command data Sd=0.06457 is an irrational number and accumulates errors. It is confirmed that by selecting the multiplier α for normalization to be of a large value so that the differential speed command data Sd will be an integer, any grinding error within the gear width W of several tens mm is kept in a range which will not impose any practical problem. In this embodiment, the multiplier α may practically be about 100,000 or more. The foregoing description is directed to the second application in which the helical gear is ground.

The interrelationship between the feedforward control panel 18 and the semiclosed-loop control panel 28 in the synchronous operation control system shown in FIG. 1 will be described below with reference to the flowchart of FIGS. 3A, 3B, 4A, 4B, and 5. The alphabetical letters a, b following the reference letters "STP" in the flowchart represent steps of control operation effected by the feedforward control panel 18 and the semiclosed-loop control panel 28, respectively.

In steps 1a, 1b, initial data, i.e., the data shown in Table 1, are applied to the feedforward processor 22 and the semiclosed-loop processor 30 and processed thereby (STP1a, STP1b). In these steps, those data items which are not required to be processed in the sampling time ts, e.g., the rotational speed per 1 V of the servomotor 32, the resolution ratios $R_1$, $R_2$, and the like are processed.

Then, the positional output signal $PG_1$ from the pulse generator 16 coupled to the master shaft 14 is applied to the counter 20 in the feedforward control panel 18 and multiplied by 4 (STP2a, STP3a). Output data from the counter 20 is then differentiated with respect to time by the feedforward processor 22 to calculate master shaft speed data $S_M$ (see the equation (1)) corresponding to the rotational speed of the grinding wheel 12 (STP4a).

Based on the master shaft speed data $S_M$, the feedforward processor 22 executes a synchronizing arithmetic operation to calculate slave shaft speed data Ss according to the equation (7) (STP5a).

The master shaft speed data $S_M$ produced in the step 4a is transferred as parallel data to the semiclosed-loop processor 30 (STP6a). Then, a synchronizing arithmetic operation is carried out according to the equation (9) to calculate workpiece shaft speed data Sw (STP7a).

Based on the slave shaft speed data Ss calculated in the step 5a, the feedforward processor 22 applies a feedforward command signal Sff, multiplied by a feedforward loop gain Kf, to the D/A converter 24 for obtaining a predetermined rotational speed Ns=1200 rpm for the slave shaft 42 (STP8a, STP9a). The feedforward command signal Sff which is an output signal from the D/A converter 24 is then fed to the first input terminal of the adder 26 (STP20).

The semiclosed-loop control panel 28 receives a positional output signal PG, from the pulse generator 33 coupled to the slave shaft 42, and multiplies the output signal $PG_2$ by 4 in the counter 34 (STP2b, STP3b). The count from the counter 34 is differentiated into slave shaft speed data $Ss_1$ corresponding to the semiclosed-loop system, as according to the equation (7) (STP4b). The slave shaft speed data $Ss_1$ is then compared with the slave shaft speed data Ss which is the result of the synchronizing arithmetic operation corresponding to the feedforward system based on the equation (7) (STP5b).

A traverse shaft positional output signal $PG_4$ from the pulse generator 84 coupled to the traverse shaft 83 is multiplied by 4 by the counter 88, and the multiplied-by-4 output signal from the counter 88 is applied to and differentiated by the semiclosed-loop processor 30 to produce traverse shaft speed data $St_1$ corresponding to the semiclosed-loop system according to the equation (13) (STP6b, STP7b). Then, the differential arithmetic operation according to the equation (14) is effected (STP8b).

The master shaft speed data $S_M$ from the feedforward processor 22 is received by the semiclosed-loop processor 30 (STP9b). Then, a positional error $Ep_1$ corresponding to the semiclosed-loop system is calculated (STP10b, STP11b, STP12b). More specifically, an integrated value of the master shaft speed data $S_M$ in the step 10b and an integrated value of the traverse shaft speed data $St_1$ in the step 11b are added, and an integrated value of the slave shaft speed data $Ss_1$ is subtracted from the sum of the integrated values.

Then, the positional error $Ep_1$ is differentiated with respect to time to produce a speed error $Ev_1$ (STP13b), and the positional error $Ep_1$ is integrated to produce a positional error integral $Ep_{I1}$ (STP14b). The positional error $Ep_1$ calculated in the steps 10b through 12b is multiplied by a positional loop gain $Kp_1$ (STP15b), and the speed error $Ev_1$ calculated in the step 13b is multiplied by a speed gain $Kv_1$ (STP16b). Thereafter, the positional integral error $Ep_{I1}$ calculated in the step 14b is multiplied by an integral gain $Ki_1$ (STP17b). The results produced in the steps 15b, 16b, 17b are added (STP18b), and an output signal indicative of the sum is applied as a semiclosed-loop command signal $Sf_2$ via the D/A converter 38 to the second terminal of the adder 26 (STP19b).

The adder 26 adds the feedforward command signal Sff and the semiclosed-loop command signal $Sf_2$, and supplies the sum data through the servoamplifier 40 to the slave shaft servomotor 32 (STP20, STP21, STP22).

As described above, the feedforward control panel 18 and the semiclosed-loop control panel 28 are coupled to each other for effecting the synchronizing arithmetic operations.

With the above embodiment, angular positional information is detected by the rotary encoder coupled to the master shaft of a gear grinding machine, a hobbing machine, or the like, and is processed to control the slave shaft to rotate in synchronism with the master shaft. In such synchronous operation control system of the master/slave type, the synchronous rotational speed ratio and various parameter gains are entered all as numerical data. Therefore, various specifications of workpieces (e.g., the number of teeth, the module, the helix angle of thread, and the like if the workpiece is a gear) and various specifications of the machine (e.g., the number of threads of the tool, the gear train, the speed reduction ratio, and the like) can be switched instantaneously to make the machine tool flexible enough to manufacture many different product types each in a small quantity.

Optimum numerical values of the parameter gains (a speed error gain, a positional error gain, etc.) for varying mechanical constants (motor and load inertia, a viscous resistance, a spring constant, and the like) or varying rotational speeds may be stored so that gains matching a certain machining condition can instantaneously be selected. Since multiplications are employed in the synchronizing arithmetic operations, the shafts can be synchronized theoretically no matter what values the encoder pulse ratio and the speed reduction ratio may have (if subtractions are employed, those values of these ratios which produce remainders cannot be used).

Synchronizing arithmetic operations can also be carried out when the traverse table supporting the workpiece is fed in the traverse direction. Accordingly, a helical gear or the like can be ground or otherwise machined highly accurately.

For calculating a positional error between the master shaft and the slave shaft, an output signal from an encoder coupled to one of the shafts and having a lower resolution is multiplied, and an output signal from an encoder coupled to the other shaft and having a higher resolution is also multiplied, and the multiplied signals are compared with each other. The workpiece can be ground or machined highly accurately without lowering the accuracy of the resolution of the encoders. The shafts can be synchronized theoretically no matter what values the encoder pulse ratio and the speed reduction ratio may have.

FIG. 6 shows a gear grinding apparatus incorporating a synchronous operation control system according to another embodiment of the present invention. Those parts shown in FIG. 6 which are identical to those of FIG. 1 are denoted by identical reference numerals, and will not be described in detail.

A pulse generator 60 serving as a fourth rotary encoder is coupled via a coupling 57 to the end of the workpiece shaft 56 remote from the workpiece 31. An output signal $PG_4$ from the pulse generator 60 is applied to a fully-closed-loop processor 66 through a multiply-by-4 counter 64 in a fully-closed-loop control panel 62.

A multiplied-by-4 signal applied from the counter 64 to the fully-closed-loop processor 66 is then compared with the master shaft speed data $S_M$ from the feedforward processor 22. An output signal indicative of the result of the comparison is applied through a D/A converter 79 as a fully-closed-loop command signal $Sf_1$ to a third input terminal of the adder 26.

The output signal $PG_3$ from the pulse generator 84 is applied via the multiply-by-4 counter 88 to the semi-closed-loop processor 30 in the semiclosed-loop control panel 28, and also via a multiply-by-4 counter 86 in the fully-closed-loop control panel 62 to the fully-closed-loop processor 66. Therefore, the amount of movement of the workpiece in the traverse direction of the arrow A upon energization of the traverse motor 8 is subjected to differential arithmetic operations (described later on) by the fully-closed-loop processor 66 and the semi-closed-loop processor 30, and the results of the operations are added to the semiclosed-loop command signal $Sf_2$ and the fully-closed-loop command signal $Sf_1$. Then, signals representing the sums are applied via the D/A converters 38, 79 to the adder 26.

The fully-closed-loop control panel 62 has a clock input terminal CK which is supplied with the sampling clock signal Ts that is produced by frequency-dividing the output signal from the quartz oscillator (not shown). In the embodiment of FIG. 6, the sampling clock signal Ts also has a sampling time ts of 300 μs.

Each of the multiply-by-4 counters 64, 86 in the fully-closed-loop control panel 62 shown in FIG. 6 is identical in construction to the multiply-by-4 counters 20, 34, 88 shown in FIG. 2.

Operation and advantages of the gear grinding apparatus of FIG. 6 are as follows:

Various specifications of the workpiece 31 and various specifications such as resolutions of the pulse generators 16, 33, 60, 84 are given in Table 2 below. Table 2 differs from Table 1 in that a workpiece shaft encoder resolution Rw=324,000 p/r is added to Table 2. These specifications are entered into memories (not shown) in the feedforward processor 22, the fully-closed-loop processor 66, and the semiclosed-loop processor 30 through input means (not shown):

TABLE 2

| Specifications | |
|---|---|
| Number of workpiece teeth | Z = 60 |
| Workpiece module | Mn = 2.5 |
| Helix angle of workpiece thread | β = LH 25° |
| Workpiece width | W = 20 mm |
| Resolution of master shaft encoder | RM = 60000 p/r |
| Resolution of slave shaft encoder | Rs = 240000 p/r |
| Resolution of workpiece shaft encoder | Rw = 324000 p/r |
| Number of encoder pulses produced each time traverse shaft moves 1 mm | Rt = 10000 p/mm |
| Speed reduction ratio for workpiece shaft | Q = 24 |
| Sampling time | ts = 300 μs |

Operations in a feedforward system and a positioning loop, i.e., the fully-closed-loop control system and the semiclosed-loop control system, where the workpiece is a spur gear will first be described, and then operations in the respective control systems, taking into consideration the amount of movement in the traverse direction, where the workpiece is a helical gear will be described.

A process of grinding a spur gear will first be described below. When the grinding wheel 12 is rotated at the speed $N_M$=3000 rpm by the tool motor 10, the pulse generator 16 generates an output signal $PG_1$ composed of successive pulses. The output signal $PG_1$ is applied via the counter 20 to the feedforward processor 22 in the feedforward control panel 18. Therefore, when the grinding wheel 12 as a tool is rotated at $N_M$=3000 rpm, pulses or master shaft speed data $S_M$ generated by the pulse generator 16 in each sampling time ts=300 μs are 900 p/sample as indicated by the following equation (21):

$$S_M = (N_M/60) \times R_M \times ts \text{ (p/sample)} \quad (21)$$
$$= (3000/60) \times 60000 \times 300 \times 10^{-6}$$
$$= 900 \text{ (p/sample)}$$

If the number Z of teeth of the workpiece is Z=60 when the rotational speed $N_M$ of the grinding wheel 12 is $N_M$=3000 rpm, the rotational speed $N_W$ of the workpiece is 50 rpm as given by the following equation (22):

$$N_W = (P/Z) \times N_M \text{ (rpm)} = (1/60) \times 3000 \quad (22)$$
$$= 50 \text{ (rpm)}$$

where P is the number of the threads of the tool which corresponds to the number of the threads of the grinding wheel 12, and is 1 as described above.

In view of the fact that the gear train 45 interposed as a rotation transmitting means between the servomotor 32 and the workpiece 31 has a speed reduction ratio Q of 24:1 (Q=24), the servomotor 32 should be rotated at a speed of 1200 rpm as indicated by the following equation (23):

$$Ns = N_W \times Q \text{ (rpm)} = 50 \times 24 = 1200 \text{ (rpm)} \quad (23)$$

Assuming that a rated input volta $V_R$ to be applied to the servomotor 32 when its rated rotational speed $N_{SR}$ is 3000 rpm is $V_R$=6 V based on rated values of the servomotor 32 and the servoamplifier 40, the rotational speed of the servomotor 32 per one volt is 500 rpm/V, and a voltage of 2.4 V should be applied to the servomotor 32 by the servoamplifier 40 in order to rotate he servomotor 32 at 1200 rpm. This relationship is expressed by the following equation (24):

$$N_{SR}/V_R = \text{Rated rotational speed/Rated input voltage} \quad (24)$$
$$= 3000/6 = 500 \text{ (rpm/V)}$$

If the D/A converter 24 is of 12 bits, and in order to obtain a voltage of 2.4 V to rotate the servomotor 32 at Ns=1200 rpm with an output voltage which corresponds to 12 bits being ±10 V, a value $V_{(D/A24)}$=2539 should be supplied to the D/A converter 24 as indicated by the equation (25):

$$V_{(D/A24)} = \frac{2^{12} \times 2.4}{20} + 2^{11} = 2539 \tag{25}$$

Therefore, the feedforward command signal Sff is given a value which is produced by converting the value $V_{(D/A24)}$ to an analog signal. In this embodiment, the servoamplifier 40 operates as a voltage follower. Insofar as the grinding wheel 12 is rotated at $N_M = 3000$ rpm, the workpiece 31 is synchronously rotated at $N_W = 50$ rpm.

A positional loop control system is required since the D/A converter 24 or the servoamplifier 40 is subjected to an error such as an analog offset or drift. Such a positional loop control system will be described below.

The positional loop control system comprises the semiclosed-loop control system which is composed of the semiclosed-loop control panel 28 for producing a feedback output signal $PG_2$ as converted to data of the workpiece shaft 56, from the slave shaft 42, and the fully-closed-loop control system which is composed of the fully-closed-loop control panel 62 for obtaining a feedback output signal $PG_4$ directly from the workpiece shaft 56.

The semiclosed-loop control system which produces the feedback output signal $PG_2$ directly from the servomotor 32 that is relatively stable without being affected by a backlash error caused by the gear train 45 is controlled with a high gain. In order to correct the error of the gear train 45, the fully-closed-loop control system is controlled with a low gain. Since the fully-closed-loop control system tends to become unstable due to the backlash of the gear train 45 or the rigidity of the gear train 45 itself, the fully-closed-loop control system is difficult to control with a high gain, and hence is handled as an auxiliary loop.

The main loop or the semiclosed-loop control system controlled with a high loop gain will be described below. For achieving highly accurate synchronous rotation, it is necessary to effect accurate positional control. Such highly accurate synchronous rotation is obtained as follows: First, a positional output signal $PG_1$ produced by the pulse generator 16 in the feedforward control system, described above, is converted to master shaft speed data $S_M$, and then a positional output signal $PG_2$ produced by the pulse generator 33 in the semiclosed-loop control system is converted to slave shaft speed data Ss. Then, the semiclosed-loop command signal $Sf_2$ is controlled by the semiclosed-loop processor 30 such that the product $(S_M \times Rs)$ of the master shaft speed data $S_M$ and the resolution Rs of the pulse generator 33 will be of the same value as that of the product $(Ss \times R_M \times Z)$ of the slave shaft speed data Ss of the pulse generator 33, the resolution $R_M$ of the pulse generator 16, and the number Z of teeth of the workpiece 31. A positional error Ep is calculated according to an equation (26) below. If the product of the master shaft speed data $S_M$ and the slave shaft encoder resolution ratio $Ro = Rs/R_M$ is equal to the product of the slave shaft speed data Ss, the master shaft encoder resolution ratio $R_1 = 1$, and the number Z of workpiece teeth, then it is determined that the master shaft 14 and the workpiece shaft 56 are completely synchronized. If the above products are different from each other, then the value produced by multiplying the difference or positional error Ep by a positional loop gain Kp (not shown) is issued to the D/A converter 38 to rotate the servomotor 32 to compensate for the positional error Ep.

$$\begin{aligned} Ep &= \text{(master shaft speed data} \times \text{slave shaft} \tag{26} \\ &\quad \text{encoder resolution ratio)} - \text{(slave shaft speed} \\ &\quad \text{data} \times \text{master shaft encoder resolution ratio} \times \\ &\quad \text{number of workpiece teeth)} \\ &= (S_M \times Rs/R_M) - (Ss \times 1 \times Z) \\ &= (900 \times 4) - (60 \times 1 \times 60) = 0 \end{aligned}$$

The slave shaft speed data Ss is given by the following equation (27):

$$\begin{aligned} Ss &= \frac{Ns}{60} \times Rs \times ts + Q \tag{27} \\ &= \frac{1200}{60} \times 240000 \times 300 \times 10^{-6} + 24 \\ &= 60 \ (p/\text{sample}) \end{aligned}$$

The result of the calculation according to the equation (26) indicates that the master shaft 14 and the slave shaft 42 are rotated in full synchronism with each other.

Now, a condition in which the master shaft 14 and the slave shaft 42 are rotated out of synchronism and correction is needed will be described below. It is assumed that an output signal $PG^2$ is applied to the semiclosed-loop control panel 2 such that the rotation of the slave shaft 42 is slightly delayed out of synchronism with the rotation of the master shaft 14 and the slave shaft speed data Ss is Ss=59 {which represents the servomotor rotational speed Ns =1180 (rpm)}. The positional error Ep then has a value 60 as indicated by the following equation (28):

$$Ep = (900 \times 4) - (59 \times 1 \times 60) = 60 \ (p) \tag{28}$$

The positional error Ep is multiplied by the positional loop gain Kp in the semiclosed-loop processor 30, and the product is applied to the D/A converter 38, so that the rotational speed of the servomotor 32 is increased to eliminate the delay. Conversely, if the slave shaft 42 becomes faster than the master shaft 14 and the positional error Ep goes negative (Ep<0), the output signal from the D/A converter 38 also goes negative, thus delaying the servomotor 32 until it gains a normal rotational speed. The unit for the positional error Ep is [p]=[pulses] because the master shaft speed data $S_M$ and the slave shaft speed data Ss may substantially be of values thereof which are integrated with respect to the sampling time ts.

Positional loop control of the fully-closed-loop control system having a low loop gain will be described below.

The master shaft speed data $S_M$ supplied to the fully-closed-loop control system is $S_M = 900$ [p/sample], as described above. The workpiece shaft speed data Sw is given according to the following equation (29):

$$\begin{aligned} Sw &= \frac{N_M/Z}{60} \times Rw \times ts \ (p/\text{sample}) \tag{29} \\ &= \frac{3000/50}{60} \times 324000 \times 300 \times 10^{-6} \\ &= 97.2 \ (p/\text{sample}) \end{aligned}$$

In the fully-closed-loop processor 66, the master shaft speed data $S_M$ and the workpiece shaft speed data Sw are compared, and the difference is integrated to produce a positional error $Ep_2$. After the positional error $E_2$ has been multiplied by a positional loop gain $Kp_2$, the product is supplied as a fully-closed-loop command signal $Sf_1$ via the D/A converter 7 to the adder 26 for effecting feedback control. More specifically, in order to compare the master shaft speed data $S_M$ and the workpiece shaft speed data Sw at the same level, normalizing operations are effected on these data to calculate normalized master shaft speed data $S_{MS}$ and normalized workpiece shaft speed data Sws according to the following equations (30) and (31):

$$S_{MS} = S_M \times \frac{Rs}{R_M} \qquad (30)$$
$$= 900 \times \frac{324000}{60000} = 4860$$

$$Sws = Ss \times \frac{NM}{Ns} \qquad (31)$$
$$= 97.2 \times \frac{3000}{60} = 4860$$

Therefore, a positional error $Ep_2$ is given by the following equation (32):

$$Ep_2 = \int (S_{MS} - Sws)d(\text{sample}) = 0 \qquad (32)$$

That the value of the positional error $Ep_2$ is zero means that the master shaft 14 and the workpiece shaft 56 are rotated in synchronism with each other.

As described above, for calculating the positional error $Ep_2$ between the master shaft 14 and the slave shaft 42, the output signal $PG_1$ from the pulse generator 16 which is a master shaft encoder having a low encoder resolution is multiplied and then compared with the output signal $PG_4$ from the pulse generator 60 which is a workpiece shaft encoder having a high encoder resolution. Therefore, the arithmetic operations can be executed highly accurately without lowering the accuracy of the encoder resolutions. According to the present invention, this principle is applied also to the calculations of a positional error between other shafts.

For grinding the spur gear, as described above, it is possible to rotate the master shaft 14 and the slave shaft 42 accurately in synchronism with each other with the feedforward control system and the positional loop control system. If no sufficient synchronous rotation can be achieved only by the feedforward control system and the positional loop control system, then it is possible to add various PID (proportional, integral, derivative) control systems such as a speed loop control system for differentiating the positional error Ep to control the slave shaft 42 with a speed error Ev, an acceleration loop control system for differentiating the speed error Ev to control the slave shaft 42 with an acceleration error Ea, and a positional integral error control system for integrating the positional error Ep to control the slave shaft 42 with a positional integral error $Ep_I$. The above description has been directed to the grinding of a spur gear in a first application.

A process of grinding a helical gear in a second application will be described below. In this grinding process, the distance by which the helical gear is moved in the traverse direction (i.e., in the axial direction of the gear) must be detected, and the synchronous rotation of the master and slave shafts 14, 42 must be differentially corrected. The differential correction is effected by detecting the distance of movement in the traverse direction with the pulse generator 84 connected to the traverse shaft 83 and producing a value including the helix angle $\beta$ of the gear through arithmetic operations.

The diameter d of the helical gear on its pitch circle is 165.5 mm according to the following equation (33):

$$d = \frac{Z \cdot Mn}{\cos\beta} = \frac{60 \times 2.5}{0.9063} = 165.5 \text{ mm} \qquad (33)$$

(see Table 2 above for the definition of the symbols)

An angle Y of displacement of the gear on its pitch circle across the gear width W=20 mm then becomes about 6.457° as indicated by the following equation (34):

$$Y = \frac{W \cdot \tan\beta}{\pi \cdot d} \times 360 = \frac{W \cdot \sin\beta}{\pi \cdot Z \cdot Mn} \times 360 \qquad (34)$$
$$= \frac{20 \times 0.4226 \times 360}{\pi \times 60 \times 2.5} \approx 6.457°$$

Thus, when the helical gear is moved across its width W=20 mm in the traverse direction, it is necessary to correct the synchronous rotation by 6.457° on the pitch circle of the gear. The corrective value is then converted to feedback pulses per revolution of the workpiece shaft 56. Required feedback pulses Pd which correspond to the output signal $PG_4$ from the pulse generator 84 are 4305 as calculated by the equation (35) below. The same feedback pulses Pd can be calculated from the displacement angle Y on the pitch circle (see the equation (36) below):

$$Pd = \frac{Rt \times W}{Rt} \times \frac{\sin\beta}{\pi \cdot Z \cdot Mn} \times Rs \ (p) \qquad (35)$$
$$= \frac{200000}{10000} \times \frac{0.4226}{\pi \times 60 \times 2.5} \times 240000$$
$$\approx 4305 \ (p)$$

$$Pd = \frac{Y}{360} \times Rs \qquad (36)$$
$$= \frac{6.457}{360} \times 240000 = 4305 \ (p)$$

Therefore, when the helical gear traverses its width W=20 mm, about 4305 feedback pulses Pd should be corrected. In reality, the above calculations are effected in each sampling time ts=300 μs. Since the traversing speed is 1 mm/sec. in this embodiment, pulses to be generated per sampling cycle, i.e., the traverse shaft speed data St, is 3 (p/sample) as calculated from the following equation (37), and differential speed command data Sd is indicated by the equation (38):

$$St = 1 \times Rt \times ts \qquad (37)$$
$$= 1 \times 10000 \times 300 \times 10^{-6} = 3 \ (p/\text{sample})$$

$$Sd = \frac{3 \times 0.4226 \times 24000}{10000 \times \pi \times 60 \times 2.5} \qquad (38)$$
$$\approx 0.06457 \ (p)$$

Consequently, 0.06457 pulse is corrected per sampling time ts. Inasmuch as this value is only a decimal fraction, it does not allow integral operations by itself, and hence is normalized by being multiplied by a multiplier. Stated otherwise, the differential speed command data Sd=0.06457 is an irrational number and accumulates errors. It is confirmed that by selecting the multiplier α for normalization to be of a large value so that the differential speed command data Sd will be an integer, any grinding error within the gear width W of several tens mm is kept in a range which will not impose any practical problem. In this embodiment, the multiplier α may practically be about 100,000 or more. The foregoing description is directed to the second application in which the helical gear is ground.

The interrelationship between the feedforward control panel 18, the fully-closed-loop control panel 62, and the semiclosed-loop control panel 28 in the synchronous operation control system shown in FIG. 6 will be described below with reference to the flowchart of FIGS. 7A, 7B, 7C, 8A, 8B, 8C, and 9. The alphabetical letters a, b, c following the reference letters "STP" in the flowchart represent steps of control operation effected by the feedforward control panel 18, the semiclosed-loop control panel 28, and the fully-closed-loop control system 62, respectively. Those processing steps which are identical to those shown in the flowchart of FIGS. 3A, 3B, 4A, 4B, and 5 in the first embodiment are denoted by identical reference numerals, and will only briefly be described.

In steps 1a, 1b, 1c, initial data. i.e., the data shown in Table 2, are applied to the feedforward processor 22, the semiclosed-loop processor 30, and the fully-closed-loop processor 66, and processed thereby (STP1a, STP1b, STP1c). In these steps, those data items which are not required to be processed in the sampling time ts, e.g., the rotational speed per 1 V of the servomotor 32, the resolution ratios $R_1$, $R_2$, and the like are processed.

Then, the positional output signal $PG_1$ from the pulse generator 16 coupled to the master shaft 14 is applied to the counter 20 in the feedforward control panel 18 and multiplied by 4 (STP2a, STP3a). Output data from the counter 20 is then differentiated with respect to time by the feedforward processor 22 to calculate master shaft speed data $S_M$ (see the equation (21)) corresponding to the rotational speed of the grinding wheel 12 (STP4a).

Based on the master shaft speed data $S_M$, the feedforward processor 22 executes a synchronizing arithmetic operation to calculate slave shaft speed data Ss according to the equation (27) (STP5a).

The master shaft speed data $S_M$ produced in the step 4a is transferred as parallel data to the semiclosed-loop processor 30 (STP6a). Then, a synchronizing arithmetic operation is carried out according to the equation (29) to calculate workpiece shaft speed data Sw (STP7a).

The master shaft speed data $S_M$ is transferred as parallel data to the fully-closed-loop processor 66 (STP7a'). Based on the slave shaft speed data Ss calculated in the step 5a, the feedforward processor 22 applies a feedforward command signal Sff, multiplied by a feedforward loop gain Kf, to the D/A converter 24 for obtaining a predetermined rotational speed Ns = 1200 rpm for the slave shaft 42 (STP8a, STP9a). The feedforward command signal Sff which is an output signal from the D/A converter 24 is then fed to the first input terminal of the adder 26 (STP20).

The semiclosed-loop control panel 28 receives a positional output signal $PG_2$ from the pulse generator 33 coupled to the slave shaft 42, and multiplies the output signal $PG_2$ by 4 in the counter 34 (STP2b, STP3b). The count from the counter 34 is differentiated into slave shaft speed data $Ss_1$ corresponding to the semiclosed-loop system. as according to the equation (27) (STP4b). The slave shaft speed data $Ss_1$ is then compared with the slave shaft speed data Ss which is the result of the synchronizing arithmetic operation corresponding to the feedforward system based on equation (27) (STP5b).

A traverse shaft positional output signal $PG_3$ from the pulse generator 84 coupled to the traverse shaft 83 is multiplied by 4 by the counter 88, and the multiplied-by-4 output signal from the counter 88 is applied to and differentiated by the semiclosed-loop processor 30 to produce traverse shaft speed data $St_1$ corresponding to the semiclosed-loop system according to the equation (37) (STP6b, STP7b). Then, the differential arithmetic operation according to the equation (38) is effected (STP8b).

The master shaft speed data $S_M$ from the feedforward processor 22 is received by the semiclosed-loop processor 30 (STP9b). Then, a positional error $Ep_1$ corresponding to the semiclosed-loop system is calculated (STP10b, STP11b, STP12b). More specifically, an integrated value of the master shaft speed data $S_M$ in the step 10b and an integrated value of the traverse shaft speed data $St_1$ in the step 11b are added, and an integrated value of the slave shaft speed data $Ss_1$ is subtracted from the sum of the integrated values.

Then, the positional error $Ep_1$ is differentiated with respect to time to produce a speed error $Ev_1$ (STP13b), and the positional error $Ep_1$ is integrated to produce a positional integral error $Ep_{I1}$ (STP14b) The positional error $Ep_1$ calculated in the steps 10b through 12b is multiplied by a positional loop gain $Kp_1$ (STP15b), and the speed error $Ev_1$ calculated in the step 13b is multiplied by a speed gain $Kv_1$ (STP16b). Thereafter, the positional integral error $Ep_{I1}$ calculated in the step 14b is multiplied by an integral gain $Ki_1$ (STP17b). The results produced in the steps 15b, 16b, 17b are added (STP18b), and an output signal indicative of the sum is applied as a semiclosed-loop command signal $Sf_2$ via the D/A converter 38 to the second terminal of the adder 26 (STP19b).

The fully-closed-loop control panel 62 receives a positional output signal $PG_3$ from the pulse generator 60 coupled to the workpiece shaft 56 (STP2c), and multiplies the output signal $PG_4$ by 4 in the counter 64 (STP3c), and the count from the counter 64 is differentiated with respect to time into workpiece shaft speed data Sw (STP4c). The workpiece shaft speed data Sw is then compared with the result of the synchronizing arithmetic operation based on the equation (29) (STP5c). The traverse shaft positional output signal $PG_3$ from the pulse generator 84 coupled to the traverse shaft 83 is multiplied by 4 by the counter 86 in the fully-closed-loop control panel 62, and the multiplied-by-4 output signal from the counter 88 is applied to and differentiated by the fully-closed-loop processor 66 to produce traverse shaft speed data $St_2$ corresponding to the fully-closed-loop system according to the equation (37) (STP6c, STP7c). Then, the differential arithmetic operation according to the equation (38) is effected (STP8c).

The master shaft speed data $S_M$ from the feedforward processor 22 is received by the fully-closed-loop processor 66 (STP9c). Then, a positional error $Ep_2$ is calculated (STP10c, STP11c, STP12c). More specifically, an integrated value of the master shaft speed data $S_M$ in the step 10c and an integrated value of the traverse shaft speed data $St_2$ in the step 11c are added, and an integrated value of the slave shaft speed data $Ss_2$ is subtracted from the sum of the integrated values.

Then, the positional error $Ep_2$ is differentiated with respect to time to produce a speed error $Ev_2$ (STP13c), and the positional integral error $Ep_2$ is integrated to produce a positional integral error $Ep_{j2}$ (STP14c). The positional error $Ep_2$ calculated in the steps 10c through 12c is multiplied by the positional loop gain $Kp_1$ (STP15c), and the speed error $Ev_2$ calculated in the step 13c is multiplied by a speed gain $Kv_2$ (STP16c). Thereafter, the positional integral error $Ep_{j2}$ calculated in the step 14c is multiplied by an integral gain $Ki_2$ (STP17c). The results produced in the steps 15c, 16c, 17c are added (STP18c), and an output signal indicative of the sum is applied as a fully-closed-loop command signal $Sf_1$ via the D/A converter 79 to the third terminal of the adder 26 (STP19c).

The adder 26 adds the feedforward command signal Sff, the semiclosed-loop command signal $Sf_2$, and the fully-closed loop command signal $Sf_1$, and supplies the sum data through the servoamplifier 40 to the slave shaft servomotor 32 (STP20, STP21, STP22).

As described above, the feedforward control panel 18, the fully-closed-loop control panel 62, and the semiclosed-loop control panel 28 are coupled to each other for effecting the synchronizing arithmetic operations.

With the above embodiment, angular positional information is detected by the rotary encoder coupled to the master shaft of a gear grinding machine, a hobbing machine, or the like, and is processed to control the slave shaft to rotate in synchronism with the master shaft. In such synchronous operation control system of the master/slave type the synchronous rotational speed ratio and various parameter gains are entered all as numerical data. Therefore, various specifications of workpieces (e.g., the number of teeth, the module, the helix angle of thread, and the like if the workpiece is a gear) and various specifications of the machine (e.g., the number of threads of the tool, the gear train, the speed reduction ratio, and the like) can be switched instantaneously to make the machine tool flexible enough to manufacture many different product types each in a small quantity.

Optimum numerical values of the parameter gains (a speed error gain, a positional error gain, etc.) for varying mechanical constants (motor and load inertia, a viscous resistance, a spring constant, and the like) or varying rotational speeds may be stored so that gains matching a certain machining condition can instantaneously be selected.

Synchronizing arithmetic operations can also be carried out when the traverse table supporting the workpiece is fed in the traverse direction. Accordingly, a helical gear or the like can be ground or otherwise machined highly accurately.

For calculating a positional error between the master shaft and the workpiece shaft or between the master shaft and the slave shaft, an output signal from an encoder coupled to one of the shafts and having a lower resolution is multiplied, and an output signal from an encoder coupled to the other shaft and having a higher resolution is also multiplied, and the multiplied signals are compared with each other. The workpiece can be ground or machined highly accurately without lowering the accuracy of the resolution of the encoders.

Figure 10:
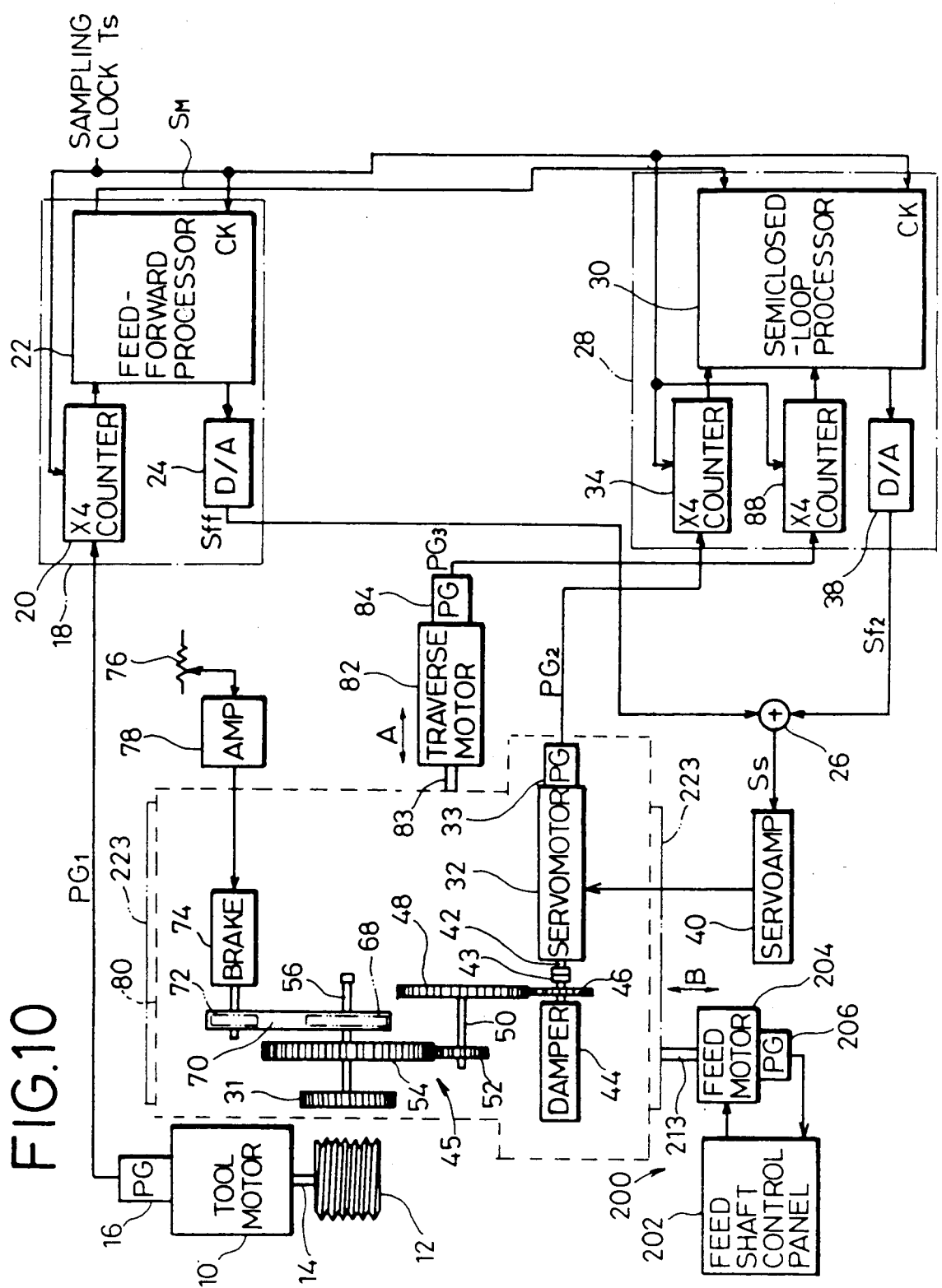
FIGS. 10 and 11 are block diagrams of gear grinding apparatus incorporating synchronous operation control systems according to other embodiments of the present invention.
Figure 11:
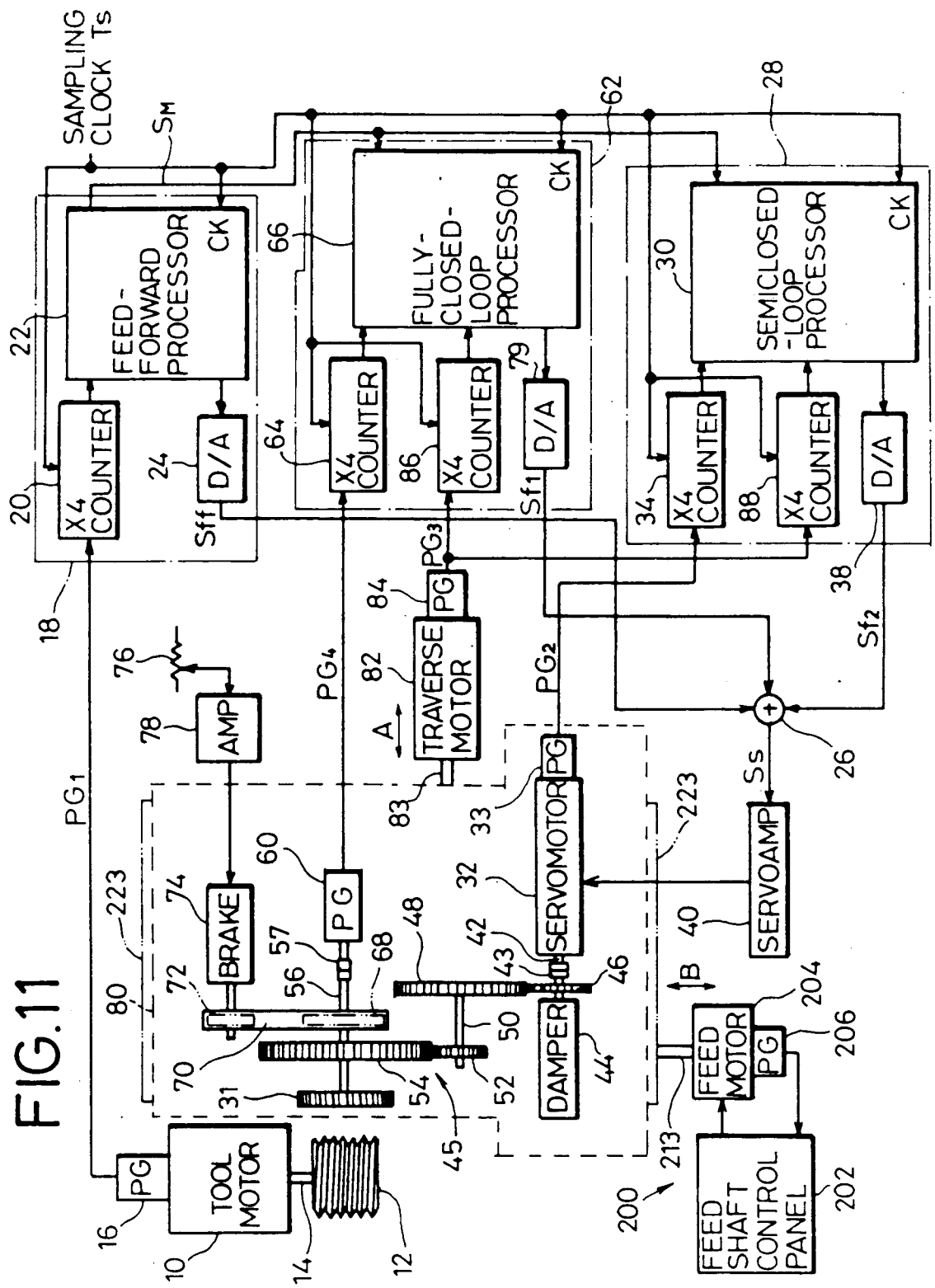

FIGS. 10 and 11 show gear grinding apparatus combined with synchronous operation control systems according to other embodiments of the present invention. The gear grinding apparatus shown in FIGS. 10 and 11 differ from those of FIGS. 1 and 6, respectively, in that they additionally have a servo control system 200 for moving a feed table 223 in the directions of the arrow B along a feed shaft. The gear grinding apparatus of FIGS. 10 and 11 are suitable for crowning a workpiece or gear 31.

Those components of the gear grinding apparatus shown in FIGS. 10 and 11 which are identical to those shown in FIGS. 1 and 6 are denoted by identical reference numerals, and will not be described in detail.

The servo control system 200 basically comprises a feed shaft control panel 202, a feed motor 204 comprising a servomotor, for example, and a pulse generator 206 coupled coaxially to the feed motor 204.

Figure 12:
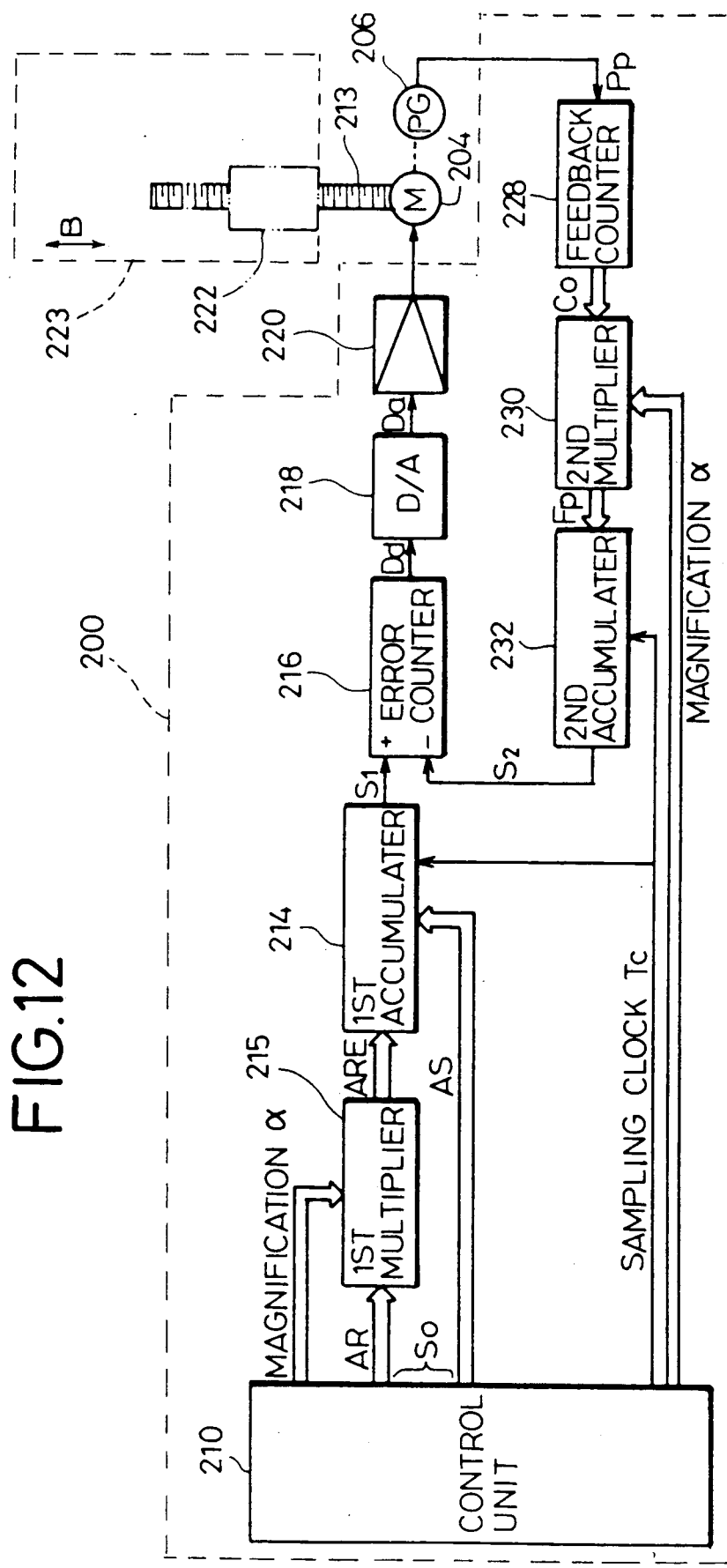
FIG. 12 is a block diagram of a servo control system in the gear grinding apparatus shown in FIGS. 10 and 11.

FIG. 12 illustrates the servo control system 200 in detail. The servo control system 200 includes a control unit 210 for issuing a rotation command signal $S_0$ which represents rotational speed data AS for the feed motor 204 and moving distance data AR for a feed shaft 213 which comprises a ball screw that is coupled to the feed motor 204 and rotatable thereby. The moving distance data AR is multiplied by a first multiplier 215, as described later on, into moving distance data ARE which is applied to one input terminal of a first accumulator 214 and stored therein. The rotational speed data AS is applied to another input terminal of the first accumulator 214. The first accumulator 214 sends a rotational command signal $S_1$ to an additive input terminal of an error counter 216 each time a sampling clock signal Tc is applied to the first accumulator 214.

A digital error output signal Dd from the error counter 216 is applied to and converted by a D/A converter 218 into an analog error output signal Da that is applied to a servoamplifier 220. The servoamplifier 220 amplifies the applied analog error output signal Da to a voltage high enough to drive the feed motor 204, and applies the amplified signal to the feed motor 204. The feed shaft 213 coupled to the feed motor 204 is threaded through a nut 222 secured to a feed table 223 which extends perpendicularly to the traverse table 30. Therefore, by energizing the feed motor 204, the feed table 223 is moved in one direction or the other along the feed shaft 213 to allow the workpiece or gear 31 mounted on the traverse table 80 to be crowned or shaved by the grinding wheel 12.

When the feed motor 204 is energized, pulses are generated from the pulse generator 206 serving as a position detector coupled to the feed motor 204, at a resolution Rc [pulses/revolution]. The position detecting pulses $Pp = Nc \times Rc$ [Nc indicates the rotational speed (rps) of the feed motor 204] thus produced are counted by a feedback counter 228. An output signal from the feedback counter 228 is multiplied by a second multiplier 230, the output signal of which is stored as feedback pulse data Fp in a second accumulator 232 for feeding back pulses. The feedback pulse data Fp stored in the second accumulator 232 is then applied to a subtractive input terminal of the error counter 216 each time a sampling clock signal Tc is applied to the second accumulator 232, for thereby effecting feedback control.

The servo control system 210 has a speed resolution Rv of 1 pps (pulses/sec.), and a positioning resolution Rp of 1 μm, i.e., a value produced by dividing the distance which the feed table 223 is moved per revolution of the feed shaft 213, by the resolution Rc of the pulse generator 206. The sampling clock signal Tc has a sampling period of 1 ms.

The gear grinding apparatus incorporating the synchronous operation control system shown in FIGS. 10 and 12 will operate as follows:

FIG. 13 is a flowchart of an operation sequence of the servo control system 200 shown in FIG. 12. Operation of the gear grinding apparatus will be described with reference to the flowchart of FIG. 13.

First, it is assumed that the rotational speed data AS is set to 5 pps and the moving distance data AR is set to 1 mm. In this case, the control unit 210 stores rotational speed data AS=5 pps in the first accumulator 214, and, since the positioning resolution Rp is 1 μm, the moving stance data AR is multiplied by 1000 (1 mm=1 μm×1000) and the result is sent to the first multiplier 215. The magnification α of the first multiplier 215 is set to:

$$\alpha = \frac{1 \text{ second}}{\text{sampling time } Ts} = \frac{1S}{1ms} = 1000$$

Therefore, the moving distance data ARE is converted to data corresponding to 1,000,000 pulses, and the converted data is stored in the first accumulator 214 (STPI).

Then, a step II determines whether the moving distance ARE stored in the first accumulator 214 is zero or not. Since the moving distance data ARE is not zero, i.e., all the moving distance data ARE=1,000,000 pulses is stored in the first accumulator 214, control goes from the step II to a step III.

In the step III, when one sampling clock pulse Tc is applied to the first accumulator 214, the first accumulator 214 effects a predetermined arithmetic operation, i.e., (the moving distance data ARE—the rotational speed data AR), to subtract 5 from the moving distance data ARE. Then, the rotational speed data AR=5 is delivered as an additive value or a rotational command signal $S_1$ to the error counter 216 (STPIV).

Inasmuch as a feedback subtractive signal $S_2$ which is being applied from the second accumulator 232 to the subtractive input terminal of the error counter 216 is of a zero value, a digital error output signal Dd is of a value of 5 and converted by the D/A converter 218 to an analog error output signal Da which is applied to the servoamplifier 220. Since the gain of the servoamplifier 220 is adjusted to 1/1000 (1/α), the feed motor 204 starts rotating at a speed of 5/1000 (rps). At this time, the speed resolution of the pulse generator 206 is 1 pps. Therefore, not a single position detecting pulse Pp is produced, and no signal is applied to the feedback counter 228, with its count being zero. Because the data stored in the second accumulator 232 is zero, a value to be set in a step V is zero (STPV), and control goes to a step VI.

In the step VI, the feedback subtractive signal $S_2$, which indicates zero data in this case, is applied from the second accumulator 232 to the subtractive input terminal of the error counter 216 which then subtracts the feedback subtractive signal $S_2$ from the rotational command signal $S_1$. As the feedback subtractive signal $S_2$ is zero at this time, the value of the digital error output signal Dd from the error counter 216 remains unchanged (STPVII).

The value of the digital error output signal Dd from the error counter 216 is 5. The digital error output signal Dd is converted by the D/A converter 218 to the analog error output signal Da which is amplified by the servoamplifier 220 to energize the feed motor 204 (STPVIII).

The rotational command signal $S_1$ is fed to the additive input terminal of the error counter 216 each time a sampling clock pulse Tc is applied. When the value of the digital error output signal Dd from the error counter 216 becomes 5000 or more, the pulse generator 206 produces one position detecting pulse Pp which is then multiplied 1000 times by the second multiplier 230 with the same magnification α as that in the first multiplier 215. The multiplied data is stored as feedback pulse data Fp in the second accumulator 232 (STPV). When a next sampling clock pulse Tc is generated, the feedback subtractive signal $S_2$ having a value of 5 is applied to the subtractive input terminal of the error counter 216 (STPVI). As a result, 5 is decremented from the digital error output signal Dd by the error counter 216 (STPVII), with the consequence that the value of the digital error output signal Dd becomes 5005 or 5000. Since the gain of the servoamplifier 220 is adjusted to 1/1000, the feed shaft 213 coupled to the feed motor 204 is rotated with its smoothness or positioning resolution increased to an apparent value which is 1000 times larger. Therefore, the workpiece such as a gear or the like which is moved by the nut 222 in the direction of the arrow B can smoothly be shaped or crowned. When the data stored in the first accumulator 214 is reduced to a value less than 5000, the value of the digital error output signal Dd from the error counter 216 is reduced by decrements of 5 from 5000, thus gradually decelerating the feed motor 204. After the value of the digital error output signal Dd from the error counter 216 becomes zero, i.e., after 1000 position detecting pulses Pp have been generated by the pulse generator 206, the feed motor 204 is de-energized, putting the positioning control process to an end.

With the above embodiments shown in FIGS. 10 through 13, the moving distance data is set to the reciprocal of the product of the speed resolution and the sampling time. Accordingly, the servo drive source such as a servomotor can smoothly be rotated without having to increasing the mechanical resolution o the position detector which is coupled to the servomotor. The control system can be employed in applications where no high positioning accuracy is required but smooth control is needed such as for crowning a gear or the like. The control system is reduced in cost since no highly accurate, high-resolution position detector is used.

The servomotor may be replaced with another servo drive source such as a servovalve or the like.

Although certain preferred embodiments have been shown and described, it should be understood that many changes and modifications may be made therein without departing from the scope of the appended claims.

What is claimed is:

1. A synchronous operation control system for a numerically controlled machine, comprising:
   a master shaft with a tool mounted thereon;
   a first motor for rotating said master shaft;
   a slave shaft;
   a second motor for rotating said slave shaft;
   a workpiece shaft operatively coupled to said slave shaft for supporting a workpiece which is to be machined by said tool;
   first and second encoders coupled respectively to said master and slave shafts;

processing means for differentiating output signals from said first and second encoders with respect to time and thereafter calculating at least positional errors between said master, slave, and workpiece shafts; and means for adding and subtracting output signals from said processing means and applying an output signal to said second motor.

2. A synchronous operation control system for a numerically controlled machine, comprising:

a master shaft with a tool mounted thereon;
a first motor for rotating said master shaft;
a slave shaft;
a second motor for rotating said slave shaft;
a workpiece shaft operatively coupled to said slave shaft for supporting a workpiece which is to be machined by said tool;
a traverse shaft for moving said slave shaft and said workpiece shaft in unison with each other in a traverse direction;
a third motor operatively coupled to said traverse shaft;
first, second, and third encoders coupled respectively to said master, slave shafts, and traverse shafts;
processing means for differentiating output signals from said first, second, and third encoders with respect to time and thereafter calculating at least positional errors between said master, slave, workpiece, and traverse shafts; and
means for adding and subtracting output signals from said processing means and applying an output signal to said second motor.

3. The synchronous operation control system according to claim 1 or 2, wherein said processing means comprises means for multiplying an output signal from each of said encoders by a multiplier, one of said encoders having a lower resolution than another of said encoders and thereafter comparing the multiplied output signals to calculate a difference therebetween as the positional error.

4. The synchronous operation control system according to claim 3, further comprising a feed shaft for moving said slave shaft and said workpiece shaft, and a servo drive source operatively coupled to said feed shaft for moving the feed shaft to allow said tool to machine said workpiece in a direction along said feed shaft.

5. A synchronous operation control system for a numerically controlled machine, comprising:

a master shaft with a tool mounted thereon;
a first motor for rotating said master shaft;
a slave shaft;
a second motor for rotating said slave shaft;
a workpiece shaft operatively coupled to said slave shaft for supporting a workpiece which is to be machined by said tool;
first, second, and third encoders coupled respectively to said master, slave shafts, and workpiece shafts;
processing means for differentiating output signals from said first, second, and third encoders with respect to time and thereafter calculating at least positional errors between said master, slave, and workpiece shafts; and
means for adding and subtracting output signals from said processing means and applying an output signal to said second motor.

6. A synchronous operation control system for a numerically controlled machine, comprising:

a master shaft with a tool mounted thereon;
a first motor for rotating said master shaft;
a slave shaft;
a second motor for rotating said slave shaft;
a workpiece shaft operatively coupled to said slave shaft for supporting a workpiece which is to be machined by said tool;
a traverse shaft for moving said slave shaft and said workpiece shaft in unison with each other in a traverse direction;
a third motor operatively coupled to said traverse shaft;
first, second, third, and fourth encoders coupled respectively to said master, slave shafts, workpiece, and traverse shafts;
processing means for differentiating output signals from said first, second, third, and fourth encoders with respect to time and thereafter calculating at least positional errors between said master, slave, workpiece, and traverse shafts; and
means for adding and subtracting output signals from said processing means and applying an output signal to said second motor.

7. The synchronous operation control system according to claim 5 or 6, wherein said processing means comprises means for multiplying an output signal from each of said encoders by a multiplier, one of said encoders having a lower resolution than another of said encoders, and thereafter comparing the multiplied output signals to calculate a difference therebetween as the positional error.

8. The synchronous operation control system according to claim 7, further comprising a feed shaft for moving said slave shaft and said workpiece shaft, and a servo drive source operatively coupled to said feed shaft for moving the feed shaft to allow said tool to machine said workpiece in a direction along said feed shaft.

9. The synchronous operation control system according to claim 1, 2, 5 or 6, further comprising a feed shaft for moving said slave shaft and said workpiece shaft, and a servo drive source operatively coupled to said feed shaft for moving the feed shaft to allow said tool to machine said workpiece in a direction along said feed shaft.

10. The synchronous operation control system according to claim 9, wherein said servo drive source comprises a servomotor.

11. The synchronous operation control system for a numerically controlled machine, comprising:

servo drive source means for moving a workpiece with respect to a tool;
first multiplier means for multiplying by a predetermined multiplier data indicative of a moving distance to be transversed by said servo drive source means;
first accumulator means for temporarily storing an output signal from said first multiplier means;
position detector means coupled to said servo drive source means;
counter means for counting pulses from said position detector means;
second multiplier means for multiplying by a predetermined multiplier an output signal from said counter means;
second accumulator means for temporarily storing an output signal from said second multiplier means;

error counter means for calculating a difference between output signals which are applied from said first and second accumulator means in synchronism with a sampling signal, and for applying an output signal to said servo drive source means to move said workpiece smoothly.

12. The synchronous operation control system according to claim 11, wherein each of said first and second multiplier means multiplies the output signal by a number which is equal to the number of sampling cycles per unit.

13. The synchronous operation control system according to claim 11 or 12, wherein said servo drive source comprises a servometer.

14. The synchronous operation control system according to claim 1, 2, 5, 6, 11 or 9, wherein each of said encoders comprises a pulse generator.

* * * * *